US011082867B2

(12) United States Patent
Xu et al.

(10) Patent No.: US 11,082,867 B2
(45) Date of Patent: Aug. 3, 2021

(54) METHOD AND APPARATUS FOR SUPPORTING EVENT MONITORING

(71) Applicant: Telefonaktiebolaget LM Ericsson (publ), Stockholm (SE)

(72) Inventors: Wenliang Xu, Shanghai (CN); Susana Fernandez Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 218 days.

(21) Appl. No.: 16/343,148

(22) PCT Filed: Feb. 22, 2019

(86) PCT No.: PCT/CN2019/075852
§ 371 (c)(1),
(2) Date: Apr. 18, 2019

(87) PCT Pub. No.: WO2020/073577
PCT Pub. Date: Apr. 16, 2020

(65) Prior Publication Data
US 2021/0051497 A1 Feb. 18, 2021

(30) Foreign Application Priority Data
Oct. 9, 2018 (EP) .................... 18382714

(51) Int. Cl.
H04W 4/08 (2009.01)
H04W 4/70 (2018.01)
(Continued)

(52) U.S. Cl.
CPC ............. H04W 24/08 (2013.01); H04W 4/08 (2013.01); H04W 4/70 (2018.02); H04W 8/186 (2013.01);
(Continued)

(58) Field of Classification Search
CPC ........ H04L 5/0091–0098; H04W 4/70; H04W 8/005–30; H04W 24/02–10;
(Continued)

(56) References Cited
U.S. PATENT DOCUMENTS
2016/0277243 A1* 9/2016 Kim ...................... H04W 24/08
2016/0345157 A1 11/2016 Barclay et al.
(Continued)

FOREIGN PATENT DOCUMENTS
CN 104144434 A 11/2014
CN 104769991 A 7/2015

OTHER PUBLICATIONS

3GPP, "3rd Generation Partnership Project; Technical Specification Group Services and System Aspects; Architecture enhancements to facilitate communications with packet data networks and applications (Release 16)", 3GPP TS 23.682 V16.0.0, Sep. 2018, 1-126. (Year: 2018).*

(Continued)

Primary Examiner — Timothy J Weidner
(74) Attorney, Agent, or Firm — Murphy, Bilak & Homiller, PLLC

(57) ABSTRACT

The present disclosure provides a method (400) for supporting event monitoring in a first apparatus, comprising: sending (S401) to a second apparatus a monitoring request message including a monitoring type parameter indicating a requested monitoring event to be monitored for one or a group of User Equipment UEs; and receiving (S402) from the second apparatus a first monitoring response message or a first monitoring indication message including a monitoring event report of the requested monitoring event of the one or group of UEs.

24 Claims, 10 Drawing Sheets

(51) Int. Cl.
*H04W 8/18* (2009.01)
*H04W 8/20* (2009.01)
*H04W 24/08* (2009.01)
*H04W 24/10* (2009.01)
*H04W 28/02* (2009.01)
*H04W 40/24* (2009.01)
*H04W 80/04* (2009.01)
*H04W 80/08* (2009.01)
*H04W 84/04* (2009.01)
*H04W 88/14* (2009.01)
*H04W 88/16* (2009.01)
*H04W 88/18* (2009.01)
*H04W 92/02* (2009.01)
*H04W 92/06* (2009.01)
*H04W 92/14* (2009.01)
*H04W 92/24* (2009.01)

(52) U.S. Cl.
CPC ............. *H04W 8/20* (2013.01); *H04W 24/10* (2013.01); *H04W 28/0215* (2013.01); *H04W 28/0247* (2013.01); *H04W 40/246* (2013.01); *H04W 40/248* (2013.01); *H04W 80/045* (2013.01); *H04W 80/08* (2013.01); *H04W 84/04* (2013.01); *H04W 84/042* (2013.01); *H04W 88/14* (2013.01); *H04W 88/16* (2013.01); *H04W 88/18* (2013.01); *H04W 92/02* (2013.01); *H04W 92/06* (2013.01); *H04W 92/14* (2013.01); *H04W 92/24* (2013.01)

(58) Field of Classification Search
CPC ........... H04W 28/02–26; H04W 36/0005–385; H04W 40/005–38; H04W 48/02–20; H04W 60/005–06; H04W 76/10–50; H04W 80/02–12; H04W 84/02; H04W 84/04–047; H04W 88/08–188; H04W 92/02–24
See application file for complete search history.

(56) References Cited

U.S. PATENT DOCUMENTS

2019/0028866 A1* 1/2019 Baek ...................... H04W 24/10
2019/0394712 A1* 12/2019 Ronneke ............... H04W 24/10

OTHER PUBLICATIONS

3GPP, "3rd Generation Partnership Project; Technical Specification Group Core Network and Terminals; T8 reference point for Northbound APIs; (Release 15)", 3GPP TS 29.122 V15.1.0, Sep. 2018, 1-273.
3GPP, "3rd Generation Partnership Project; Technical Specification Group Services and System Aspects; Architecture enhancements to facilitate communications with packet data networks and applications (Release 16)", 3GPP TS 23.682 V16.0.0, Sep. 2018, 1-126.

* cited by examiner

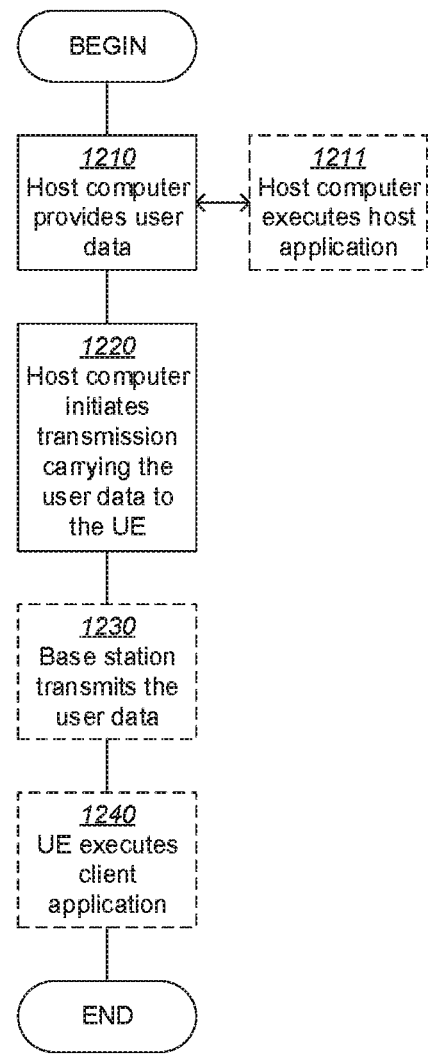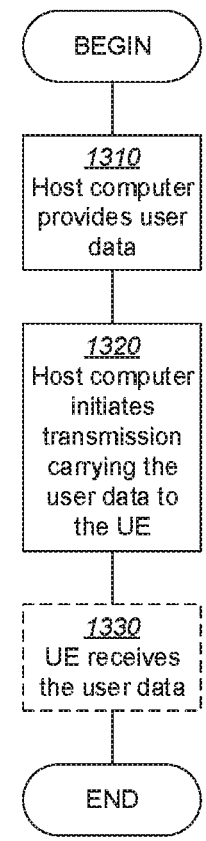
Fig. 12
Fig. 13

METHOD AND APPARATUS FOR SUPPORTING EVENT MONITORING

CROSS-REFERENCES TO RELATED APPLICATIONS

This application claims the benefit of EP Patent Application No. 18382714.6, filed Oct. 9, 2018, which is incorporated by reference herein in its entirety.

FIELD OF THE INVENTION

The present disclosure generally relates to wireless communication technique fields, in particular to methods and apparatuses for supporting event monitoring.

BACKGROUND

Monitoring Events feature is intended for monitoring of specific events in the Third Generation Partnership Project (3GPP) system and making such monitoring events information available via the Service Capability Exposure Function (SCEF). It is comprised of means that allow the identification of the 3GPP network element suitable for configuring the specific events, the event detection, and the event reporting to the authorised users, e.g. for use by applications or logging, etc. If such an event is detected, the network might be configured to perform special actions, e.g. limit the User Equipment (UE) access. Configuration and reporting of the following monitoring events may be supported, such as, LE reachability, Location of the LE, and change in location of the UE.

Support for Monitoring Events may be offered via Home Subscriber Server (HSS), Mobility Management Entity (MME) or Serving GPRS Support Node (SGSN), etc. Monitoring Events via the HSS and/or the MME/SGSN enables SCEF to configure a given Monitor Event at HSS or MME/SGSN, and reporting of the event via HSS and/or MME/SGSN. Depending on the specific monitoring event or information, it is either the MME/SGSN or the HSS that is aware of the monitoring event or information and makes it available via the SCEF.

Monitoring of events is described in related part of the 3GPP technical specification. A Service Capability Server (SCS) or an Application Server (AS) can subscribe (e.g. on behalf of an Application or for own purposes) monitoring events and receive the monitoring events report from the SCEF that is monitored in HSS and/or SGSN/MME as described in related part of that technical specification.

Some monitoring event subscription and report and the protocol details to make it feasible between the SCS/AS and the SCEF are described in related 3GPP technical specification, such as, UE reachability, Location of the UE, and change in location of the UE. However, the protocol details in current 3GPP technical specification are not enough to support all monitoring events as required.

SUMMARY

In view of the above, it is an object to provide a solution to eliminate or mitigate the deficiencies as mentioned.

The present disclosure proposes an extension of the Monitoring Event Report that enables, e.g., the SCS/AS, the AF or the other third parties to be informed of information about the status of the PDN connections of the UE(s). Specific containers and attributes are defined to provide information about the PDN connection. One new monitoring type is defined to indicate that the Packet Data Network (PDN) connection status is required and to be reported. A new feature is defined to allow the optionally and negotiation of this functionality.

According to an aspect of the disclosure, there is provided a method for supporting event monitoring in a first apparatus, comprising: sending to a second apparatus a monitoring request message including a monitoring type parameter indicating a requested monitoring event to be monitored for one or a group of User Equipment UEs; and receiving from the second apparatus a first monitoring response message or a first monitoring indication message including a monitoring event report of the requested monitoring event of the one or group of UEs.

The value of the monitoring type parameter includes a Packet Data Network PDN connectivity status of the one or group of User Equipment UEs.

The monitoring event report includes PDN connection information of the one or group of UEs.

The first apparatus is a third party server including a Service Capability Sever SCS or an Application Server AS; and the second apparatus includes a Service Capability Exposure Function SCEF or Network Exposure Function NEF.

The method further includes receiving from the second apparatus a second monitoring response message or a second monitoring indication message indicating acknowledgement of the monitoring request message or not.

The PDN connection information includes a PDN connection status, a PDN type identifying a PDN connection type, and an interface indication identifying an interface between 3GPP network and the SCS or AS.

The PDN connection information may further include an Access Point name; at least one of UE Ipv4 address or UE Ipv6 address; or both. The Ipv6 address may be replaced with UE Ipv6 prefix if Ipv6 full address is unavailable.

The PDN connection status may include a CREATED status indicating the PDN connection is created, or a RELEASED status indicating the PDN connection is released.

The PDN type may include an Internet Protocol IP type indicating a PDN connection of IP type, or a NON_IP type indicating a PDN connection of non-IP type.

The interface indication may include an Exposure function indicating a SCEF or a NEF is used for the PDN connection towards the SCS or AS, or a PDN gateway indicating a PDN gateway is used for the PDN connection towards the SCS or AS.

The method may further include detecting if a PDN connectivity status feature is supported during sending the monitoring request message and receiving the first or second monitoring response message.

According to an aspect of the disclosure, there is provided a method for supporting event monitoring in a second apparatus, comprising: receiving from a first apparatus a first monitoring request message including a monitoring type parameter indicating a requested monitoring event to be monitored for one or a group of User Equipment UEs; and sending to the first apparatus a first monitoring response message or a first monitoring indication message including a monitoring event report of the requested monitoring event of the one or group of UEs.

The monitoring type parameter is a Packet Data Network PDN connectivity status parameter indicating a PDN connectivity status of one or more User Equipment UEs.

The monitoring event report includes PDN connection information of the one or group of UEs.

The first apparatus is a third party server including a Service Capability Sever SCS or an Application Server AS; and the second apparatus includes a Service Capability Exposure Function SCEF or Network Exposure Function NEF.

The method may further comprises sending to the first apparatus a second monitoring response message or a second monitoring indication message indicating acknowledgement of the monitoring request message or not.

The PDN connection information includes a PDN connection status, a PDN type identifying a PDN connection type, and an interface indication identifying an interface between 3GPP network and the SCS or AS.

The PDN connection information may further include an Access Point name; at least one of UE Ipv4 address or UE Ipv6 address; or both, and wherein the Ipv6 address is replaced with UE Ipv6 prefix if Ipv6 full address is unavailable.

The PDN connection status may include a CREATED status indicating the PDN connection is created, and a RELEASED status indicating the PDN connection is released.

The PDN type may include an IP type indicating a PDN connection of IP type, and a NON_IP type indicating a PDN connection of non-IP type.

The interface indication includes an Exposure function indicating a SCEF or a NEF is used for the PDN connection towards the SCS or AS, and a PDN gateway indicating a PDN gateway is used for the PDN connection towards the SCS or AS.

The method may further include sending to a Home Subscriber Server HSS a second monitoring request message to configure the monitoring event indicated by the monitoring type parameter on the HSS and on a Mobility Management Entity MME or a Serving GPRS Support Node SGSN; and receiving from the HSS a third monitoring response message or a third monitoring indication message including the monitoring event report of PDN connection information of the one or group of UEs; or receiving from the HSS a fourth monitoring response message or a fourth monitoring indication message indicating acknowledgement of the second monitoring request message or not.

The method may further include receiving from the MME or SGSN a fifth monitoring indication message including the monitoring event report of PDN connection information of the one or group of UEs.

The method may further include detecting if a PDN connectivity status feature is supported during receiving the monitoring request message and sending the first or second monitoring response message.

According to an aspect of the disclosure, there is provided a first apparatus for supporting event monitoring, comprising: a sending module configured to send to a second apparatus a monitoring request message including a monitoring type parameter indicating a requested monitoring event to be monitored for one or a group of User Equipment UEs; and a receiving module configured to receive from the second apparatus a first monitoring response message or a first monitoring indication message including a monitoring event report of the requested monitoring event of the one or group of UEs.

According to an aspect of the disclosure, there is provided a first apparatus for supporting event monitoring, comprising: a transceiver configured to transmit or receive wireless signals to: from a second apparatus; one or more processors; and one or more memories comprising computer program configured to, when executed by the one or more processors, cause the first apparatus to execute the method of the related embodiments.

According to an aspect of the disclosure, there is provided a second apparatus for supporting event monitoring, comprising: a receiving module configured to receive from a first apparatus a first monitoring request message including a monitoring type parameter indicating a requested monitoring event to be monitored for one or a group of User Equipment UEs; and a sending module configured to send to the first apparatus a first monitoring response message or a first monitoring indication message including a monitoring event report of the requested monitoring event of the one or group of UEs.

According to an aspect of the disclosure, there is provided a second apparatus for supporting event monitoring, comprising: a transceiver configured to transmit or receive wireless signals to/from a first apparatus; one or more processors; and one or more memories comprising computer program configured to, when executed by the one or more processors, cause the first apparatus to execute any of the methods in related embodiments.

According to an aspect of the disclosure, there is provided a computer program comprising instructions which, when executed on at least one processor, causes the at least one processor to carry out any of the methods in related embodiments.

According to an aspect of the disclosure, there is provided a computer-readable medium having stored thereon computer program which is used to carry out any of the methods in related embodiments.

According to an aspect of the disclosure, there is provided a computer program product comprising a computer program executing any of the methods in related embodiments and a computer readable medium with the computer program. According to the embodiments of the present disclosure, an optimized method that allows Monitoring of PDN connectivity status within the framework of 3GPP technical specification is allowed. Monitoring and reporting of the information about the status of the PDN connections of the UE(s) may be implemented.

BRIEF DESCRIPTION OF THE DRAWINGS

The above and other objects, features and advantages will be more apparent from the following description of embodiments with reference to the accompanied drawings, in which:

FIGS. 12 to 15 are flowcharts illustrating methods implemented in a communication system including a host computer, a base station and a user equipment.

DETAILED DESCRIPTION

Following embodiments of the present disclosure are described in detail with reference to the accompanying drawings. It shall be understood that these embodiments are discussed only for the purpose of enabling those skilled persons in the art to better understand and thus implement the present disclosure, rather than suggesting any limitations on the scope of the present disclosure.

Figure 1:
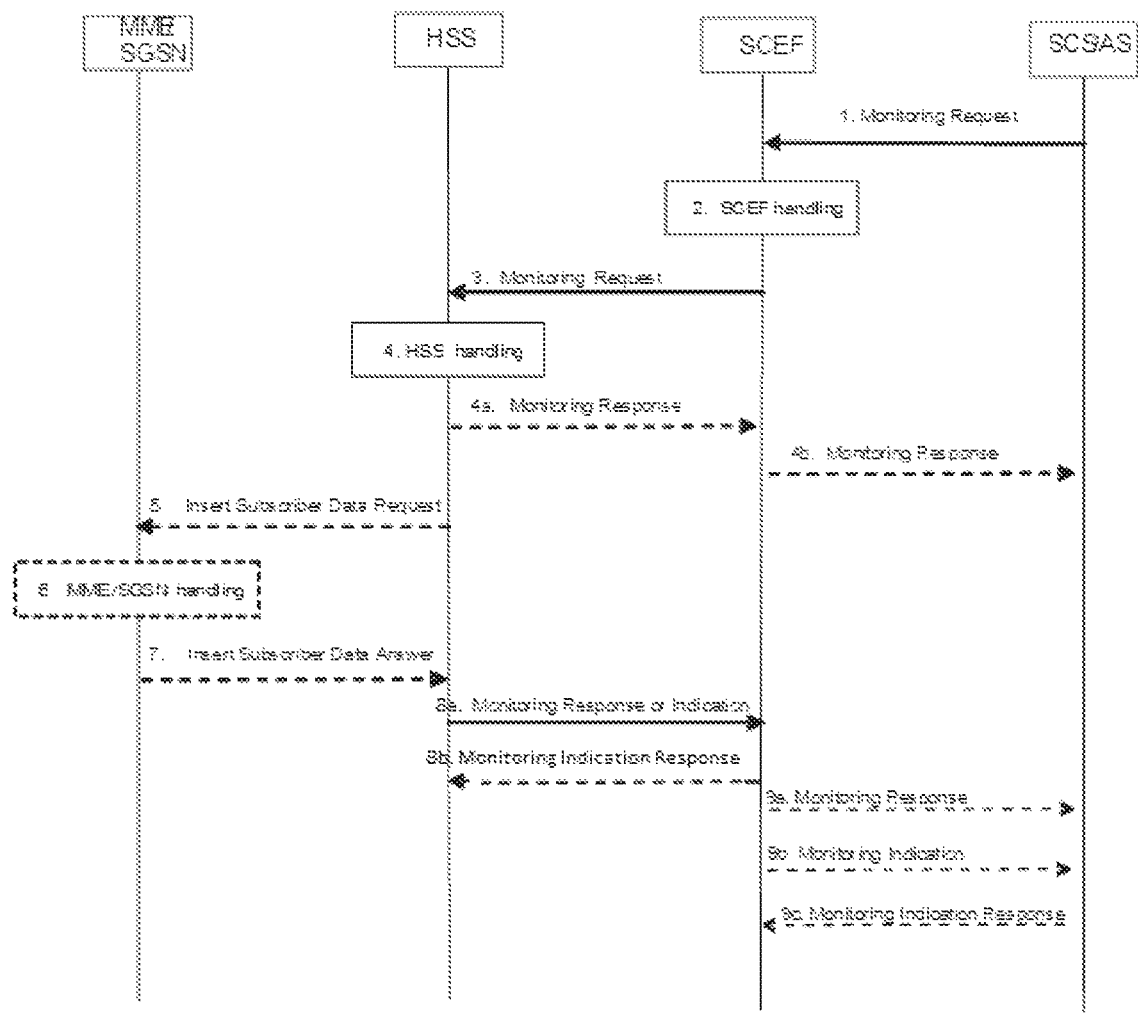
FIG. 1 is a schematic workflow diagram illustrating a subscription procedure for monitoring events applied in the present disclosure.

FIG. 1 is a schematic workflow diagram illustrating a subscription procedure for monitoring events applied in the present disclosure.

The AS may connect directly to the operator network in order to perform direct user plane communications with the UE without the use of any external SCS. Alternatively, the AS may connect indirectly to the operator network through the services of a SCS in order to utilize additional value added services for MTC (Machine Type Communication).

The SCS is an MTC Service Provider controlled entity or a mobile operator controlled entity that may include value added services for MTC and performs user plane and/or control plane communication with the UE. The SCS may connect to the 3GPP network to communicate with UEs used for MTC and/or SCEF. The SCS offers capabilities for use by one or multiple MTC Applications. A UE can host one or multiple MTC Applications. The corresponding MTC Applications in the external network may be hosted on one or multiple ASs.

The Service Capability Exposure Function (SCEF) is the key entity within the 3GPP architecture for service capability exposure that provides a means to securely expose the services and capabilities provided by 3GPP network interfaces to external 3rd party service provider SCS/AS hosting an Application(s). The services and capabilities offered by SCEF to SCS/AS include, among others, monitoring events, Non-IP Data Delivery, network parameter configuration.

The interface between the SCEF and the SCS/AS is called as T8, also referred to as the northbound interface in the context. SCEF exposed network services can be accessed by SCS/AS through Application Programming Interfaces (APIs) over T8 interface. The SCS and the AS hosting Application(s) may be collocated.

The Home Subscriber Server (HSS) supporting monitoring events feature may, among others, provide monitoring event configuration as requested from the SCEF, and provide monitoring event reporting to the SCEF. The HSS may forward the received monitoring event configuration to the corresponding MME or SGSN. The Serving GPRS Support Node (SGSN) or Mobility Management Entity (MME) supporting monitoring events feature may, among others, provide monitoring event configuration as requested from the SCEF or via HSS, and provide monitoring event reporting to the SCEF.

The SCS/AS, SCEF, HSS, MME/SGSN may be represented as AF (Application Function), NEF (Network Exposure Function), UDM (Unified Data Management), AMF (Access and Mobility Management Function) respectively in the 5G mobile network.

In an embodiment, a subscription procedure is done according to the flow as shown in FIG. 1. Through the procedure, event monitoring may be configured at the HSS or the MME/SGSN. The procedure may be used to subscribe the Monitoring Event of the PDN connectivity status of UE(s). This event allows the SCS/AS to know when the UE has initiated/released a PDN connection.

The subscription procedure as shown in FIG. 1 may be applied in the 5G mobile network similarly. Event monitoring may be configured at the UDM or the AMF. The procedure may be used to subscribe the Monitoring Event of the PDN connectivity status of UE(s). This event allows the AF to know when the UE has initiated/released a PDN connection.

According to an embodiment, the SCS/AS may send a Monitoring Request message to the SCEF. The monitoring request message may include various parameters (including monitoring event type as interested) if necessary. For example, if the SCS/AS wants to configure Monitoring Event for the group of UEs, the SCS/AS can send Monitoring Request message including External Group Identifier and Group Reporting Guard Time as described in related part of 3GPP technical specification.

The SCEF may store various parameters information and send a monitoring request message to the HSS to configure the given Monitoring Event on the HSS and on the MME/SGSN, if required. Based on operator policies, if either the SCS/AS is not authorized to perform this request (e.g. if the SLA does not allow for it) or the monitoring request is malformed or the SCS/AS has exceeded its quota or rate of submitting monitoring requests, the SCEF reject the monitoring request and provides a Cause value appropriately indicating the error in the monitoring response as depicted, e.g., in step 4b or 9a. The SCEF may also use the Group Reporting Guard. Time for a Monitoring Event Reporting for a group of UEs when the monitoring indication message is sent from the MME/SGSN to the SCEF.

The HSS may examine the Monitoring Request message, e.g. with regard to the existence of External Identifier or MSISDN or External Group Identifier, whether any included parameters are in the range acceptable for the operator, whether the monitoring event(s) is supported by the serving MME/SGSN, whether the group-basis monitoring event feature is supported by the serving MME/SGSN, or whether the monitoring event that shall be deleted is valid. The HSS may store various parameters information as provided by the SCEF. The HSS may use the Group Reporting Guard Time for a Monitoring Event Reporting for the group of UEs when the Monitoring Indication message is sent from the HSS to the SCEF. Steps 4a and 4b are used for a group of UEs based processing.

If required by the specific Monitoring Type and when Monitoring Event(s) is supported by the serving MME/SGSN, the HSS may send an Insert Subscriber Data Request message to the MME/SGSN for each individual UE and for each individual group member UE.

The MME/SGSN may verify the request and perform respective handling. The MME/SGSN may store the received parameters and starts to watch for the indicated Monitoring Event if necessary.

If the monitoring configuration is successful, the MME/SGSN sends an Insert Subscriber Data Answer (Cause) message to the HSS. If the requested Monitoring Event is available to the MME/SGSN at the time of sending Insert Subscriber Data Answer, then the MME/SGSN may include the Monitoring Event Report in the Insert Subscriber Data Answer message.

For single UE processing, the HSS may send a Monitoring Response message to the SCEF to acknowledge acceptance of the Monitoring Request and the deletion of the identified monitoring event configuration, if it was requested. If the requested Monitoring Event is available to the HSS at the time of sending Monitoring Response message or was received from the MME/SGSN in step 7, then the HSS may include a Monitoring Event Report in the Monitoring Response message of step 8*a*.

At step 9*a*, for single UE processing, the SCEF may send a Monitoring Response message to the SCS/AS to acknowledge acceptance of the Monitoring Request and the deletion of the identified monitoring event configuration, if it was requested. If the SCEF received a Monitoring Event Report then it includes the Monitoring Event Report in the Monitoring Response message.

Step 9*b* is for group-based processing. If no Group Reporting Guard Time was set, then the SCEF sends the Monitor Indication message to the SCS/AS as it receives them from the HSS. Otherwise, it accumulates Monitoring Event for the UEs of the group until the expiration of Group Reporting Guard Time. Upon expiration, the SCEF sends a Monitoring Indication message to the SCS/AS.

At step 9*c*, for each Monitoring Indication message received in step 9*b*, the SCS/AS sends a Monitoring Indication Response (Cause) message to the SCEF. Cause value reflects successful or unsuccessful acknowledgement of Monitoring Indication message.

Other details regarding the subscription procedure may refer to the related part of 3GPP IS 23.682 and will be omitted herein.

Correspondingly, similar interactions/operations as described above may be performed between corresponding entities in the 5G system except the different naming of the messages. For example, Step 1 may be replaced with a Nnef_EventExposure_Subscribe request; Step 3 may be replaced with a Nudm_EventExposure_Subscribe request; Step 4*a* may be replaced with a Nudm_EventExposure_Subscribe response; Step 4*b* may be replaced with a Nnef_EventExposure_Subscribe response; Step 5 may be replaced with a Namf_EventExposure_Subscribe request; Step 7 may be replaced with Namf_EventExposure_Subscribe response; Step 8*a* may be replaced with Nudm_EventExposure_Subscribe response or Nudm_EventExposure_Notify request; Step 8*b* may be replaced with Nudm_EventExposure_Notify response; Step 9*a* may be replaced with a Nnef_EventExposure_Subscribe response; Step 9*b* may be replaced with a Nnef_EventExposure_Notify request; and Step 9*c* may be replaced with a Nnef_EventExposure_Notify response.

Figure 2:
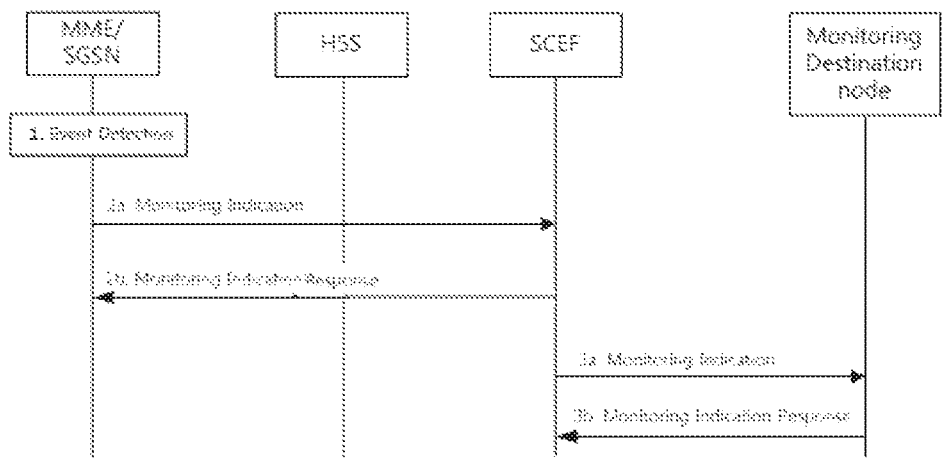
FIG. 2 is a schematic workflow diagram illustrating reporting monitoring events applied in the present disclosure.

FIG. 2 is a schematic workflow diagram illustrating reporting monitoring events applied in the present disclosure. Through the procedure, event monitoring configured at the HSS or the MME/SGSN may be reported to the destination node. The procedure may be used to report the Monitoring Event of the PDN connectivity status of UE(s).

The reporting procedure as shown in FIG. 2 may be applied in the 5G system similarly with event monitoring configured at the UDM or AME The Monitoring Event of the PDN connectivity status of UE(s) may be reported from the NEE to the AF or the other destination node.

In an embodiment, the destination node in FIG. 2 may be the SCS/AS, the AF or other third party applications.

According to an embodiment, a monitoring event may be detected by the MME/SGSN at Which the Monitoring Event is configured. The MME/SGSN sends a monitoring indication message including the monitoring event report to the SCEF. The monitoring indication message may also include user identity, SCEF Reference ID, etc. parameters if necessary. Then, the SCEF may send a monitoring indication message to the monitoring destination node. The monitoring destination node may be the SCS/AS or the other third party applications. For each Monitoring Indication message received in step 3*a*, the SCS/AS sends a monitoring indication response (Cause) message to the SCEF. Cause value reflects successful or unsuccessful acknowledgement of Monitoring Indication message.

Other details regarding the reporting procedure may refer to the related part of 3GPP TS 23.682 and will be omitted herein for the purpose of not obscuring the present disclosure.

Similarly, the similar interactions/operations as described above may be performed between corresponding entities in the 5G system except the different naming of the messages. For example, Step 2*a* may be replaced with a Namf_EventExposure_Notify request; Step 2*b* may be replaced with a Namf_EventExposure_Notify response; Step 3*a* may be replaced with a Nnef_EventExposure_Notify request; and Step 3*b* may be replaced with a Nnef_EventExposure_Notify response.

The present disclosure proposes an extension of the existing MonitoringEventReport to include a new container, pdnConnInfo, which contains all the info that an application may request related to the PDN connection status of UE.

The Monitoring Event of the PDN connectivity status may allow the SCS/AS or the AF to know when the UE has initiated/released a PDN connection.

According to an embodiment, this monitoring event is detected by the MME/SGSN or the AMF, such as when a new PDN connection is created for the UE, or when a PDN connection is deleted for the Reporting is done for PDN Connections using connection towards the SCEF (or AF). The Monitoring Event Report indicates if the event was caused by a creation or deletion of a PDN Connection. The Monitoring Event Report indicates IP address, PDN Type, Access Point Name (APN), 3GPP Interface Indication, and the new PDN Connectivity Status i.e. "created" or "deleted". For PDN Type Non-IP, the reported IP address may be the address allocated for UDP/IP tunnel.

The MME (or AMF) leaves the IP address field empty in the Monitoring Event Report if it is not available. When reporting IPv6 address, the MME reports the IPv6 prefix when the full IPv6 address is not available. The 3GPP Interface Indication is set to "API-connectivity" for PDN Connections using connection towards the SCEF, or set to "IP-connectivity" for gateway connectivity using IP based PDN Types, or set to "Other" for gateway connectivity using PDN Type Non-IP.

It is to be noted that, if NAT is used, the reported IP Address is the UK's private IP Address which is then different than the UE's public IP Address. If no IP Address is assigned to the UE during PDN connection establishment (e.g. when DHCP is used after PDN connection establishment) no IP Address is included in the report.

The SCEF (or the NEF) may send the Monitoring Event Report to SCS/AS (or the AF) based on APN determined at Monitoring Event configuration.

Figure 4:
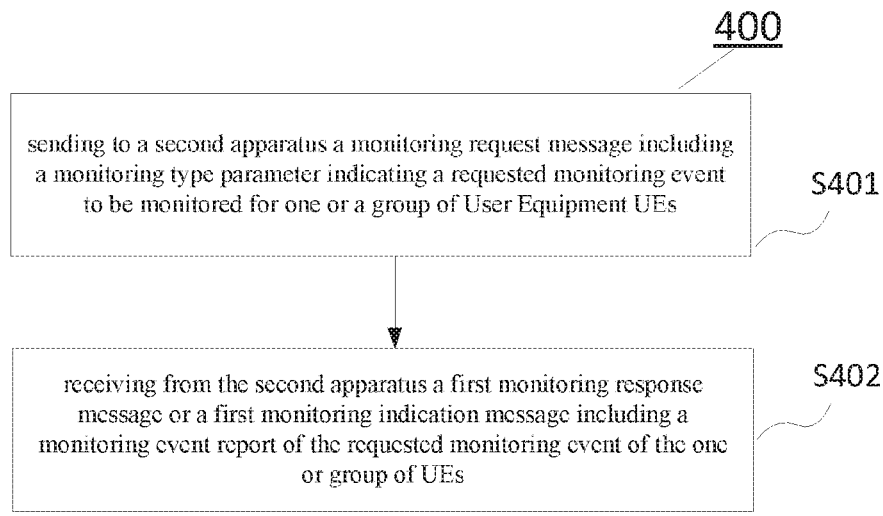
FIG. 4 is a schematic diagram illustrating a method for supporting event monitoring in a first apparatus according to an embodiment of the present disclosure.

FIG. 4 is a schematic diagram illustrating a method 400 for supporting event monitoring in a first apparatus according to an embodiment of the present disclosure.

The method 400 for supporting event monitoring in a first apparatus includes step S401, sending, to a second apparatus, a monitoring request message including a monitoring type parameter indicating a requested monitoring event to be monitored for one or a group of User Equipment UEs; and step S402, receiving, from the second apparatus, a first monitoring response message or a first monitoring indication message including a monitoring event report of the requested monitoring event of the one or group of UEs.

Figure 3A:
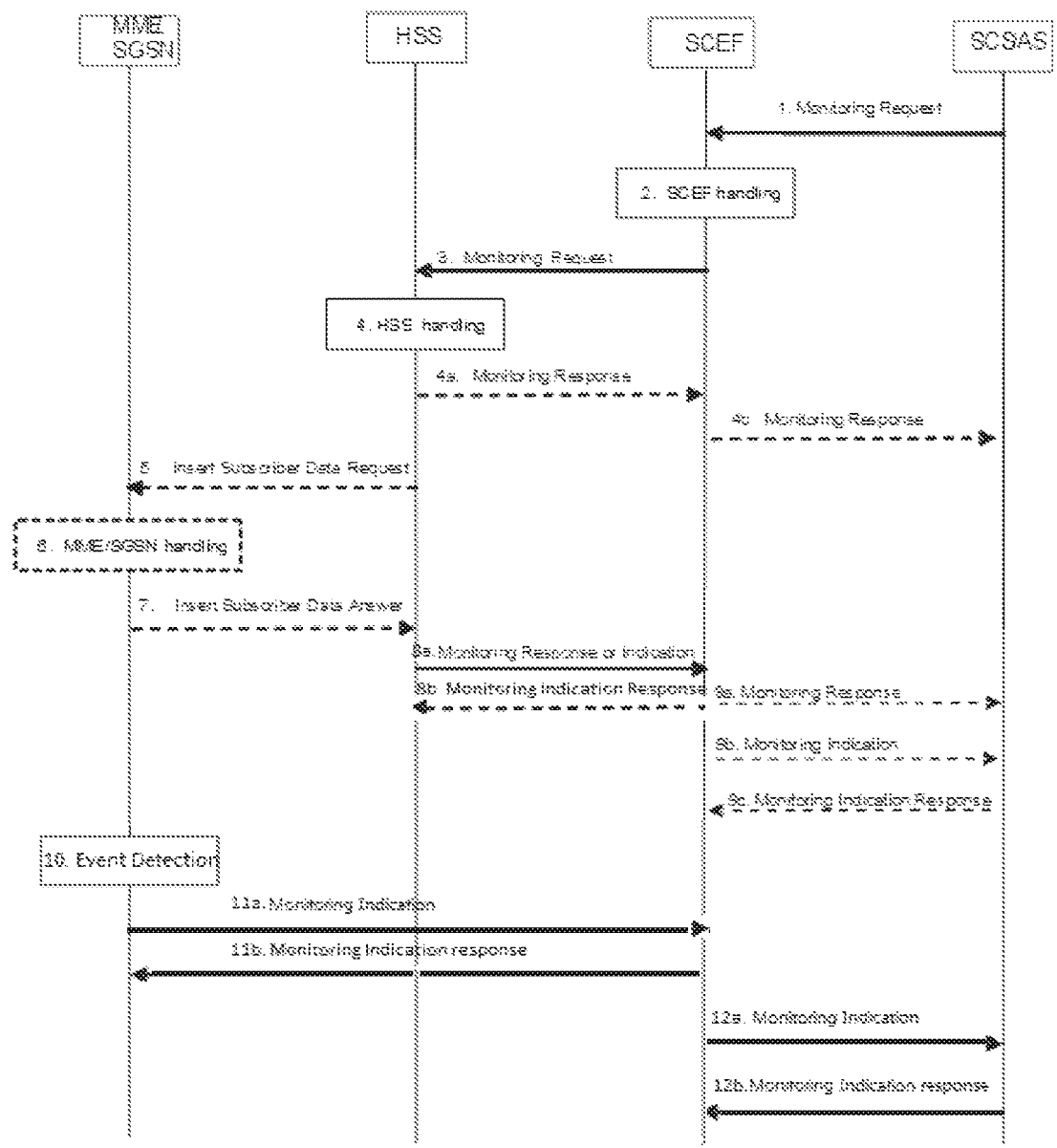
FIGS. 3*a*-3*b* are a schematic workflow diagram illustrating a method for supporting event monitoring including monitoring event subscription and reporting in 4G network and 5G network, respectively according to embodiments of the present disclosure.
Figure 3B:
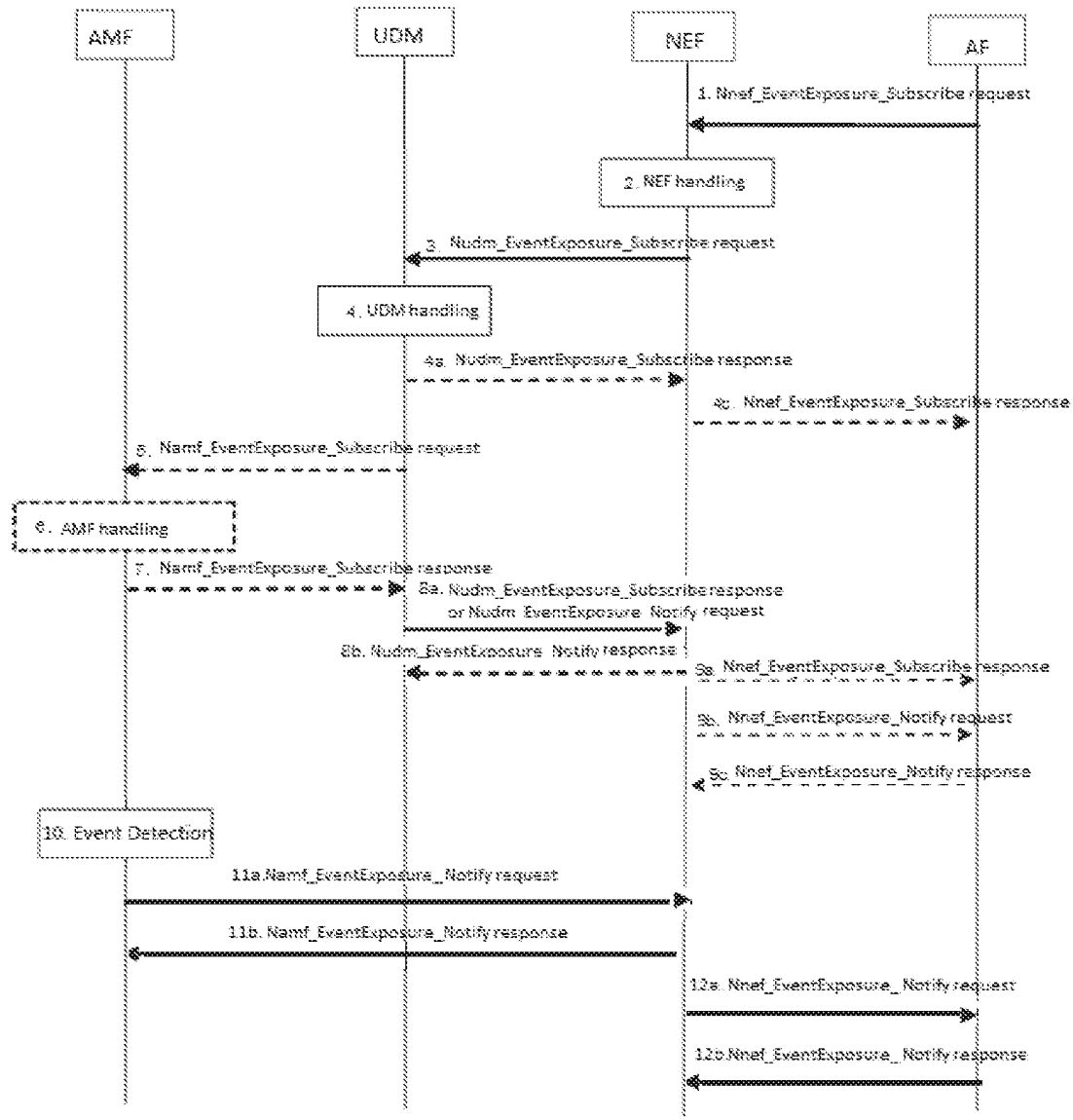

In the embodiment, also referring to FIGS. 3a and 3b, the first apparatus may be a third party application/server including a Service Capability Sever (SCS) or an Application Server (AS), or the Application Function (AF); and the second apparatus includes a Service Capability Exposure Function SCEF or Network Exposure Function NEF.

The monitoring request message may refer to the monitoring request message from the SCS/AS to the SCEF as shown in FIG. 3a. Alternatively, the monitoring request message may also refer to the Nnef_EventExposure_Subscribe request message from the AF to the NEF as shown in FIG. 3b.

The first monitoring response message or the first monitoring indication message refers to the type of message that includes a monitoring event report of the requested monitoring event of the one or group of UEs. For example, the first monitoring response message may refer to the message with the monitoring event report in Step 9a in FIGS. 3a and 3b; the first monitoring indication message may refer to the message with the monitoring event report in Step 9b or Step 12a in FIGS. 3a and 3b.

In an embodiment, the monitoring event report may include PDN connection information of the one or group of UEs as shown in the following Table 1 which lists the definition of type MonitoringEventReport. The value of the monitoring type parameter may include a Packet Data Network PDN connectivity status of the one or group of User Equipment UEs as shown in the following Table 2.

This data type represents a monitoring event notification which may be sent from, e.g., the SCEF to the SCS/AS.

TABLE 1

Definition of type MonitoringEventReport

| Attribute Name | Data type | Cardinality | Description | Applicability (NOTE 1) |
|---|---|---|---|---|
| imeiChange | AssociationType | 0 . . . 1 | If "monitoring-Type" is "CHANGE_OF_IMSI_IMEI_ASSOCIATION", this parameter shall be included to identify the event of change of IMSI-IMEI or IMSI-IMEISV association is detected. Refer to 3GPP TS 29.336 [11] Subclause 8.4.22. | Change_of_IMSI_IMEI_association_notification |
| externalids | array(ExternalId) | 0 . . . N | External identifier (NOTE 2) | |
| idleStatusInfo | IdleStatusInfo | 0 . . . 1 | If "idleStatusIndication" in the "MonitoringEventSubscription" sets to "true", this parameter shall be included to indicate the information when the UE transitions into idle mode. | Ue-reachability_notification, Availability_after_DDN_failure_notification |
| locationInfo | LocationInfo | 0 . . . 1 | If "monitoringType" is "LOCATION_REPORTING", this parameter shall be included to indicate the user location related information. | Location_notification |
| lossOfConnectReason | integer | 0 . . . 1 | If "monitoring-Type" is "LOSS_OF_CONNECTIVITY", this parameter shall be included if available to identify the reason why loss of connectivity is reported. Refer to 3GPP TS 29.336 [11] Subclause 8.4.58. | Loss_of_connectivity_notification |
| maxUEAvailabilityTime | DateTime | 0 . . . 1 | If "monitoring-Type" is "UE_REACHABILITY", this parameter may be included to identify the timestamp until which a UE using a power saving mechanism is expected to be reachable for SM delivery. Refer to Subclause 5.3.3.22 of 3GPP TS 29 338 [34]. | Ue-reachability_notification |
| msisdns | array(Msisdn) | 0 . . . N | Identifies the MS internal PSTN/ISDN number (NOTE 2) | |
| monitoringType | MonitoringType | 1 | Identifies the type of monitoring type as defined in clause 5.3.2.4.3. | |
| uePerLocationReport | UePerLocationReport | 0 . . . 1 | If "monitoringType" is "NUMBER_OF_UES_IN_AN_AREA", this parameter shall be | Number_of_UEs_in_an_area_notification |

TABLE 1-continued

Definition of type MonitoringEventReport

| Attribute Name | Data type | Cardinality | Description | Applicability (NOTE 1) |
| --- | --- | --- | --- | --- |
| | | | included to indicate the number of Ues found at the location. | |
| plmnId | PlmnId | 0 . . . 1 | If "monitoringType" is "ROAMING_STATUS" and "plmnIIndication" in the "MonitoringEventSubscription" sets to "true", this parameter shall be included to indicate the UE's serving PLMN. | Roaming_status_notification |
| reachabilityType | ReachabilityType | 0 . . . 1 | If "monitoring-Type" is "UE_REACHABILITY", this parameter shall be included to identify the reachability of the UE. Refer to 3GPP TS 29.336 [11] Subclause 8.4.20. | Ue-reachability_notification |
| roamingStatus | boolean | 0 . . . 1 | If "monitoringType" is "ROAMING_STATUS", this parameter shall be set to "true" if the UE is on roaming status. Set to false or omitted otherwise. | Roaming_status_notification |
| failureCause | FailureCause | 0 . . . 1 | If "monitoringType" is "COMMUNICATION_FAILURE", this parameter shall be included to indicate the reason of communication failure. | Communication_failure_notification |
| pdnConnInfo | PdnConnectionInformation | 0 . . . 1 | If "monitoringType" is "PDN_CONNECTIVITY_STATUS", this parameter shall be included to indicate the PDN connection details. | Pdn_connectivity_status |

NOTE 1:
Properties marked with a feature as defined in subclause 5.3.4 are applicable as described in subclause 5.2.7. If no features are indicated, the related property applies for all the features
NOTE 2:
Identifies the user(s) for which the event occurred. Can be omitted if the event occurred for all users identified by the surrounding structure.

Table 2 lists various monitoring event values and the description, etc.

TABLE 2

Enumeration MonitoringType

| Enumeration value | Description | Applicability (NOTE 1) |
| --- | --- | --- |
| LOSS_OF_CONNECTIVITY | The SCS/AS requests to be notified when the 3GPP network detects that the UE is no longer reachable for signalling or user plane communication | Loss_of_connectivity_notification |
| UE_REACHABILITY | The SCS/AS requests to be notified when the UE becomes reachable for sending either SMS or downlink data to the UE | Ue-reachability_notification |
| LOCATION_REPORTING | The SCS/AS requests to be notified of the current location or the last known location of the UE | Location_notification |
| CHANGE_OF_IMSI_IMEI_ASSOCIATION | The SCS/AS requests to be notified when the association of an ME (IMEI(SV)) that uses a specific subscription (IMSI) is changed | Change_of_IMSI_IMEI_association_notification |
| ROAMING_STATUS | The SCS/AS queries the UE's current roaming status and requests to get notified when the status changes | Roaming_status_notification |
| COMMUNICATION_FAILURE | The SCS/AS requests to be notified of communication failure events | Communication_failure_notification |
| AVAILABILITY_AFTER_DDN_FAILURE | The SCS/AS requests to be notified when the UE has become available after a DDN failure | Availability_after_DDN_failure_notification |
| NUMBER_OF_UES_IN_AN_AREA | The SCS/AS requests to be notified the number of Ues in a given geographic area | Number_of_Ues_in_an_area_notification |

TABLE 2-continued

Enumeration MonitoringType

| Enumeration value | Description | Applicability (NOTE 1) |
|---|---|---|
| PDN_CONNECTIVITY_STATUS | The SCS/AS requests to be notified when the 3GPP network detects that the UE's PDN connection is set up or torn down. | Pdn_connectivity_status |

NOTE 1
Properties marked with a feature as defined in subclause 5.3.4 are applicable as described in subclause 5.2.7. If no features are indicated, the related property applies for all the features.
NOTE 2:
More monitoring types can be added in the future based on stage 2.

The first apparatus may receive, from the second apparatus, a second monitoring response message or a second monitoring indication message indicating acknowledgement of the monitoring request message or not.

The second monitoring response message or the second monitoring indication message refers to the type of message that is used to acknowledge the receipt of the monitoring request message without including the monitoring event report. For example, the second monitoring response message may refer to the message in Step 4b or the message without the monitoring event report in Step 9a in FIGS. 3a and 3b; the second monitoring indication message may refer to the message without the monitoring event report in Step 9b in FIGS. 3a and 3b.

In response to receiving the message in Step 9b or Step 12a in FIGS. 3a and 3b, the first apparatus returns a response message.

In the embodiment, the PDN connection information may include a PDN connection status, a PDN type identifying a PDN connection type, and an interface indication identifying an interface between 3GPP network and the SCS or AS.

Alternatively, the PDN connection information may include an Access Point name. The PDN connection information may also include at least one of UE Ipv4 address or UE Ipv6 address. The Ipv6 address may be replaced with LIE Ipv6 prefix if Ipv6 full address is unavailable.

In particular, the attribute pdnConnInfo in Table 1 is defined as a data type: PdnConnectioninformation. The attributes of this data type are provided in Table 3. Table 3 lists various monitoring event values and the description, etc.

The PDN connection status (as shown in Table 4, PdnConnectionStatus) may include a CREATED status indicating the PDN connection is created, or include a RELEASED status indicating the PDN connection is released, shown in Table 4.

For example, the enumeration PdnConnectionStatus represents the PDN connection status. It shall comply with the provisions defined in Table 4.

TABLE 4

Enumeration PDN ConnectionStatus

| Enumeration value | Description | Applicability (NOTE) |
|---|---|---|
| CREATED | The PDN connection is created. | Pdn_connectivity_status |
| RELEASED | The PDN connection is released. | Pdn_connectivity_status |

NOTE:
Properties marked with a feature as defined in subclause 5.3.4 are applicable as described in subclause 5.2.7. If no features are indicated, the related property applies for all the features.

The enumeration PdnType represents the PDN connection type. The PDN type may include an Internet Protocol IF type indicating a PDN connection of IP type, or include a NON_IP type indicating a PDN connection of non-IP type, as shown in Table 5.

TABLE 3

Definition of type PDN ConnectionInformation

| Attribute name | Data type | Cardinality | Description | Applicability (NOTE 1) |
|---|---|---|---|---|
| status | PdnConnectionStatus | 1 | Identifies the PDN connection status. | |
| apn | string | 0 . . . 1 | Identifies the APN, it is depending on the SCEF local configuration whether or not this attribute is sent to the SCS/AS. | |
| pdnType | PdnType | 1 | PDN type | |
| interfaceInd | InterfaceIndication | 1 | Identifies the 3GPP network function used to communicate with the SCS/AS. | |
| ipv4Addr | Ipv4Addr | 0 . . . 1 | Identifies the UE Ipv4 address. (NOTE 2) | |
| ipv6Addr | Ipv6Addr | 0 . . . 1 | Identifies the UE Ipv6 address. (NOTE 2, NOTE 3) | |

NOTE 1:
Properties marked with a feature as defined in subclause 5.5.4 are applicable as described in subclause 5.2.7. If no features are indicated, the related property applies for all the features.
NOTE 2:
At least one of UE ipv4 or ipv6 address shall be provided.
NOTE 3:
ipv6 prefix is included in this attribute if ipv6 full address is not available.

TABLE 5

Enumeration PDN Type

| Enumeration value | Description | Applicability (NOTE) |
|---|---|---|
| IP | PDN connection of IP type | Pdn_connectivity_status |
| NON_IP | PDN connection of non-IP type | Pdn_connectivity_status |

NOTE:
Properties marked with a feature as defined in subclause 5.3.4 are applicable as described in subclause 5.2.7. If no features are indicated, the related property applies for all the features.

The enumeration interface indication (e.g., InterfaceIndication) represents the interface used between the 3GPP network and the SCS/AS. The interface indication may include an Exposure function indicating a SCEF or a NEF is used for the PDN connection towards the SCS/AS or AF, or a PDN gateway indicating a PDN gateway is used for the PDN connection towards the SC S/AS or AF, as shown in Table 6.

TABLE 6

Enumeration InterfaceIndication

| Enumeration value | Description | Applicability (NOTE) |
|---|---|---|
| EXPOSURE_FUNCTION | SCEF is used for the PDN connection towards the SCS/AS. | Pdn_connectivity_status |
| PDN_GATEWAY | PDN gateway is used for the PDN connection towards the SCS/AS. | Pdn_connectivity_status |

NOTE:
Properties marked with a feature as defined in subclause 5.3.4 are applicable as described in subclause 5.2.7. If no features are indicated, the related property applies for all the features.

In an embodiment, the first apparatus may detect if a PDN connectivity status feature is supported during sending the monitoring request message and receiving the first or second monitoring response message.

In order to allow that this functionality is optional, a new Feature is added so that the functionality is only provided if it has been previously negotiated. Table 7 below defines the features used by the MonitoringEvent API. Those features are negotiated as described in the related 3GPP TS.

TABLE 7

Features used by MonitoringEvent API

| Feature Number | Feature | Description |
|---|---|---|
| 1 | Loss_of_connectivity_notification | The SCS/AS is notified when the 3GPP network detects that the UE is no longer reachable for signalling or user plane communication |
| 2 | Ue-reachability_notification | The SCS/AS is notified when the UE becomes reachable for sending either SMS or downlink data to the UE |
| 3 | Location_notification | The SCS/AS is notified of the current location or the last known location of the UE |
| 4 | Change_of_IMSI_IMEI_association_notification | The SCS/AS is notified when the association of an ME (IMEI(SV)) that uses a specific subscription (IMSI) is changed |
| 5 | Roaming_status_notification | The SCS/AS is notified when the UE's roaming status changes |
| 6 | Communication_failure_notification | The SCS/AS is notified of communication failure events |
| 7 | Availability_after_DDN_failure_notification | The SCS/AS is notified when the UE has become available after a DDN failure |
| 8 | Number_of_Ues_in_an_area_notification | The SCS/AS is notified the number of Ues present in a given geographic area |
| 9 | Notification_websocket | The delivery of notifications over Websocket is supported according to subclause 5.2.5.4. This feature requires that the Notification_test_event featute is also supported. |
| 10 | Notification_test_event | The testing of notification connection is supported according to subclause 5.2.5.3. |
| 11 | Subscription_modification | Modifications of an individual subscription resource. |
| 12 | Pdn_connectivity_status | The SCS/AS requests to be notified when the 3GPP network detects that the UE's PDN connection is set uo or torn down. |

Feature: A short name that can be used to refer to the bit and to the feature, e.g. "Notification".

Description: A clear textual description of the feature.

Figure 5:
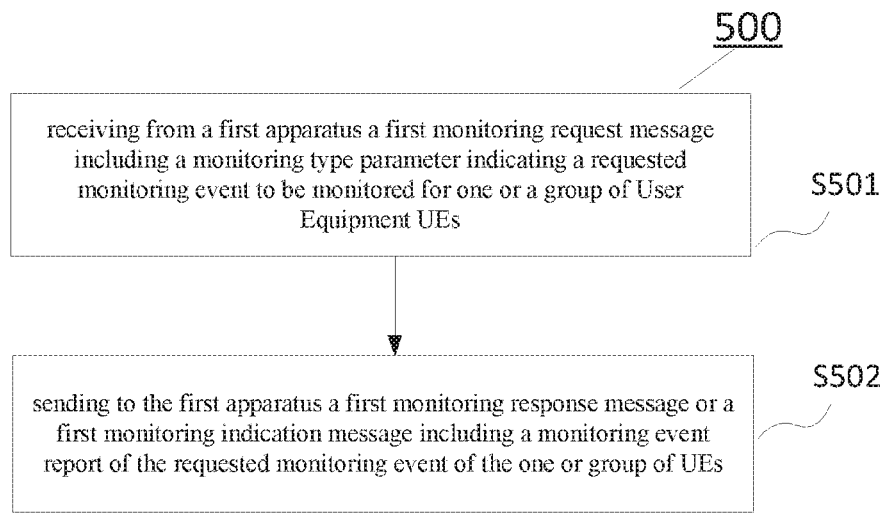
FIG. 5 is a schematic diagram illustrating a method for supporting event monitoring in a second apparatus according to an embodiment of the present disclosure.

FIG. 5 is schematic diagram illustrating a method 500 for supporting event monitoring in a second apparatus according to an embodiment of the present disclosure.

The method 500 for supporting event monitoring in a second apparatus includes Step S501, receiving, from a first apparatus, a first monitoring request message including a monitoring type parameter indicating a requested monitoring event to be monitored for one or a group of User Equipment UEs; and Step S502, sending, to the first apparatus, a first monitoring response message or a first monitoring indication message including a monitoring event report of the requested monitoring event of the one or group of UEs.

In the embodiment, also referring to FIGS. 3a and 3b, the first apparatus may be a third party application/server including a Service Capability Sever (SCS) or an Application Server (AS), or the Application Function (AF); and the second apparatus includes a Service Capability Exposure Function SCEF or Network Exposure Function NEF.

The monitoring type parameter may include a Packet Data Network PDN connectivity status parameter. The parameter may indicate a PDN connectivity status of one or more User Equipment UEs. The monitoring event report may include PDN connection information of the one or group of UEs.

The monitoring request message may include the monitoring request message from the SCS/AS to the SCEF as shown in FIG. 3a, or the Nnef_EventExposure_Subscribe request message from the AF to the NEF as shown in FIG. 3b.

The first monitoring response message or the first monitoring indication message refers to the type of message that includes a monitoring event report of the requested monitoring event of the one or group of UEs. For example, the first monitoring response message may refer to the message with the monitoring event report in Step 9a in FIGS. 3a and 3b; the first monitoring indication message may refer to the message with the monitoring event report in Step 9b or Step 12a in FIGS. 3a and 3b.

The monitoring event report may include PDN connection information of the one or group of UEs as shown in Table 1 as above. The value of the monitoring type parameter may include a Packet Data Network PDN connectivity status of the one or group of User Equipment UEs as shown in Table 2 as above.

In the embodiment, the second apparatus may send, to the first apparatus, a second monitoring response message or a second monitoring indication message indicating acknowledgement of the monitoring request message or not.

The second monitoring response message or the second monitoring indication message refers to the type of message that is used to acknowledge the receipt of the monitoring request message and does not include the monitoring event report. For example, the second monitoring response message may refer to the message in Step 4b or the message without the monitoring event report in Step 9a in FIGS. 3a and 3b; the second monitoring indication message may refer to the message without the monitoring event report in Step 9b in FIGS. 3a and 3b.

The PDN connection information and its attribute can refer to the above Tables as described in the method of the first apparatus and will be omitted here.

In the embodiment, the second apparatus may send, to a Home Subscriber Server HSS, a second monitoring request message (e.g., Step 3 in FIG. 3a or 3b) to configure the monitoring event indicated by the monitoring type parameter on the HSS and on a Mobility Management Entity MME or a Serving GPRS Support Node SGSN.

The second apparatus may receive, from the HSS, a third monitoring response message or a third monitoring indication message including the monitoring event report of PDN connection information of the one or group of UEs e.g. during the subscription procedure, or receive, from the HSS, a fourth monitoring response message or a fourth monitoring indication message indicating acknowledgement of the second monitoring request message or not. The third monitoring response message and the third monitoring indication message may refer to the message received in Step 8a, the fourth monitoring response message or a fourth monitoring indication message may refer to the message received in Step 4a, or Step 8a when no monitoring event report is included.

The second apparatus may receive, from the MME/SGSN or AMF, a fifth monitoring indication message including the monitoring event report of PDN connection information of the one or group of UEs. The fifth monitoring indication message may refer to the monitoring indication message received in Step 11a in FIG. 3a, or the Namf_EventExposure_Notify request message received in Step 11a in FIG. 3b. In response to the message received in Step 11a in FIG. 3a, the SCEF returns a monitoring indication response message to acknowledge the receipt. Similarly, in response to the message received in Step 11a in FIG. 3b, the NEF returns a Namf_EventExposure_Notify response message as in Step 11b.

In the embodiment, the second apparatus may detect if a PDN connectivity status feature is supported during receiving the monitoring request message as in Step 1 of FIGS. 3a and 3b and sending the first or second monitoring response message as in Step 9a or 4b.

Figure 6:
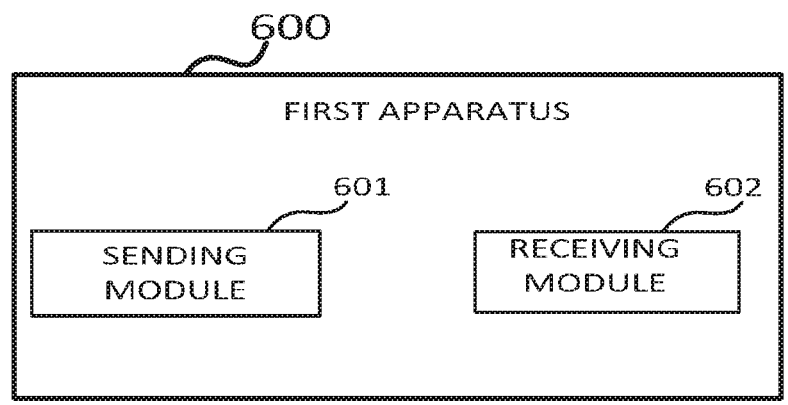
FIGS. 6-7 are a schematic block diagram illustrating a first apparatus according to an embodiment of the present disclosure.
Figure 7:
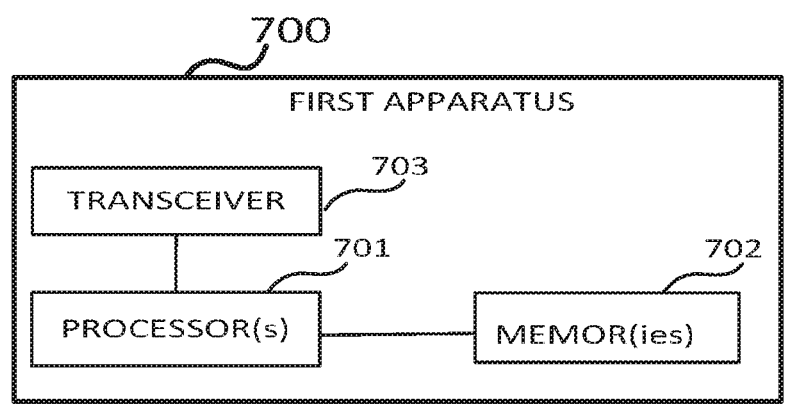

FIGS. 6-7 are schematic block diagram strafing a first apparatus 600 and 700 according to an embodiment of the present disclosure.

According to an embodiment, as shown in FIG. 6, the first apparatus 600 includes a sending module 601 and a receiving module 602. The sending module 601 sends to a second apparatus a monitoring request message including a monitoring type parameter indicating a requested monitoring event to be monitored for one or a group of User Equipment UEs. The receiving module 602 receives from the second apparatus a first monitoring response message or a first monitoring indication message including a monitoring event report of the requested monitoring event of the one or group of UEs. Other features or operations as described as above for the method for supporting event monitoring in the first apparatus may also adapted to the first apparatus 600.

According to another embodiment, as shown in FIG. 7, the first apparatus 700 includes a transceiver 703 configured to transmit or receive wireless signals to/from a second apparatus, one or more processors 701, and one or more memories 702 with computer program stored thereon, when executed by the one or more processors, cause the first apparatus to execute the method for supporting event monitoring in a first apparatus as the embodiments of the present disclosure described above.

Figure 8:
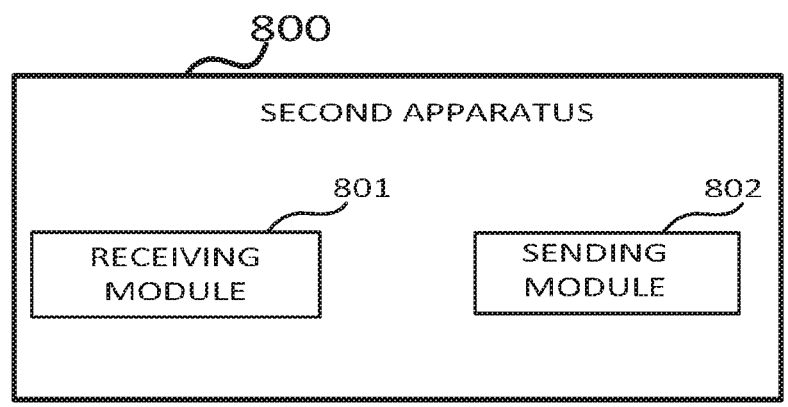
FIGS. 8-9 is a schematic block diagram illustrating a second apparatus according to an embodiment of the present disclosure.
Figure 9:
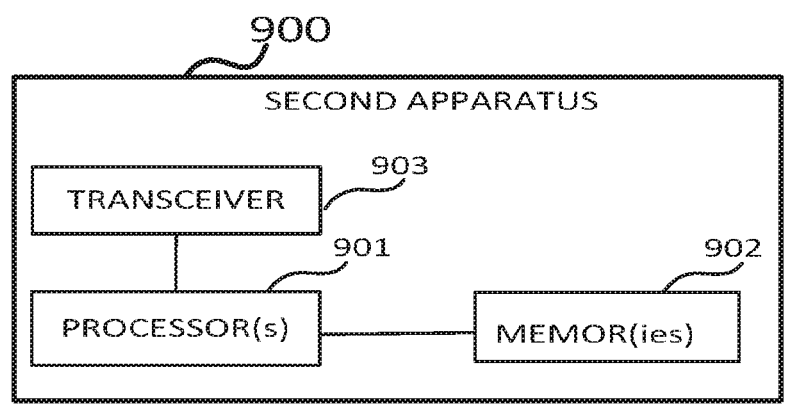

FIGS. 8-9 are schematic block diagram illustrating a second apparatus 800 and 900 according to an embodiment of the present disclosure.

According to an embodiment, as shown in FIG. 8, the second apparatus 800 includes a receiving module 801 and a sending module 802. The receiving module 801 receives from a first apparatus a first monitoring request message including a monitoring type parameter indicating a requested monitoring event to be monitored for one or a group of User Equipment UEs. The sending module 802 sends to the first apparatus a first monitoring response message or a first monitoring indication message including a monitoring event report of the requested monitoring event of the one or group of UEs. Other features or operations as described as above for the method for supporting event monitoring in the second apparatus may also adapted to the second apparatus 800.

According to another embodiment, as shown in FIG. 9, the second apparatus 900 includes a transceiver 903 configured to transmit or receive wireless signals to/from a first apparatus, one or more processors 901, and one or more memories 902 with computer program stored thereon, when executed by the one or more processors, cause the second apparatus to execute the method for supporting event monitoring in the second apparatus as the embodiments of the present disclosure described above.

The disclosure also provides a computer program with instructions which, when executed on at least one processor, causes the at least one processor to carry out the method for supporting event monitoring in the first or second apparatus as the embodiments of the present disclosure described above The disclosure also provides a computer-readable medium having stored thereon the above computer program.

The disclosure also provides a computer program product which includes the computer program and the computer readable medium as described above.

This disclosure allows the SCS/AS to request and receive information about PDN connectivity status from, e.g., MME/SGSN, HSS or SCEF based on a modified protocol as embodiments outlined above.

Figure 10:
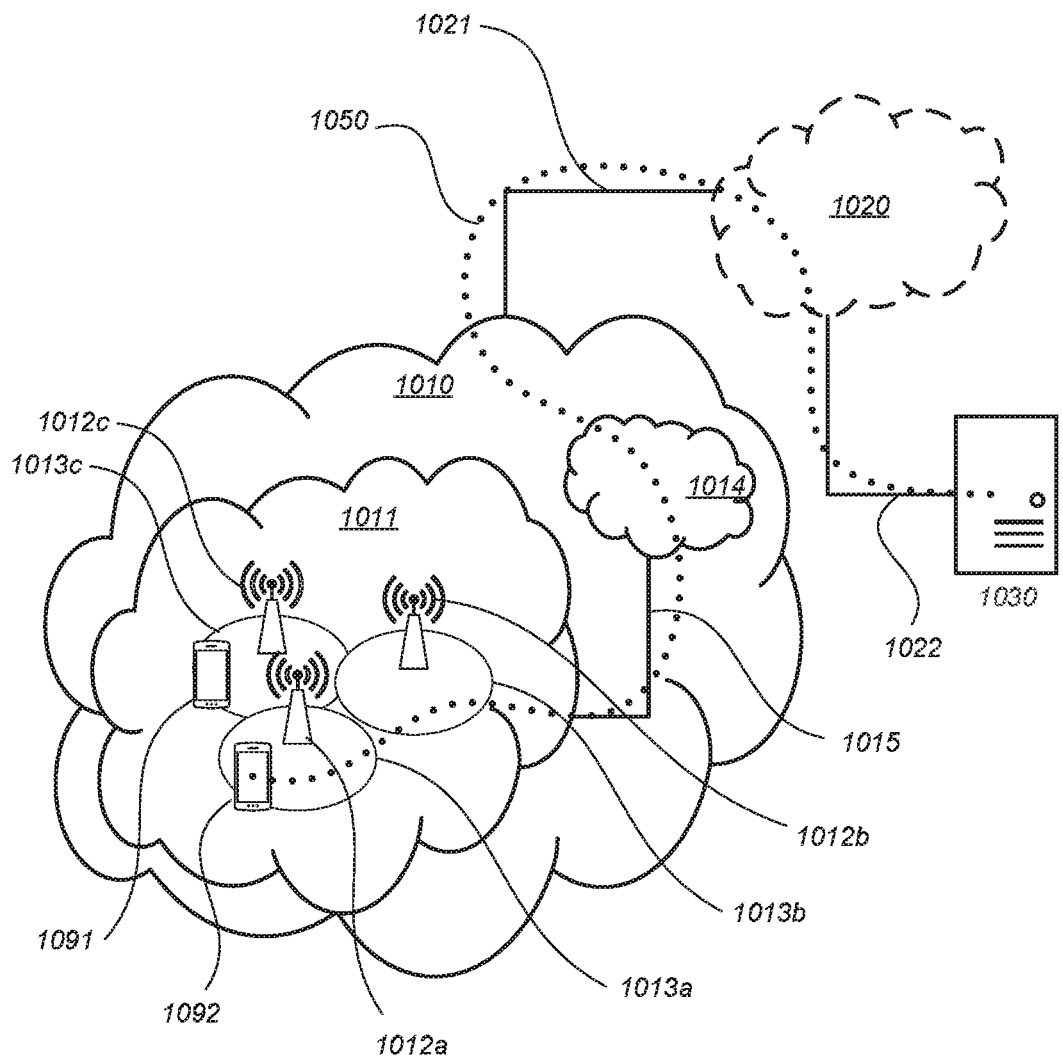
FIG. 10 schematically illustrates a telecommunication network connected via an intermediate network to a host computer.

FIG. 10 schematically illustrates a telecommunication network connected via an intermediate network to a host computer.

With reference to FIG. 10, in accordance with an embodiment, a communication system includes a telecommunication network 1010, such as a 3GPP-type cellular network, which comprises an access network 1011, such as a radio access network, and a core network 1014. The access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to the core network 1014 over a wired or wireless connection 1015. A first user equipment (UE) 1091 located in coverage area 1013c is configured to wirelessly connect to, or be paged by, the corresponding base station 1012c. A second UR 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Figure 11:
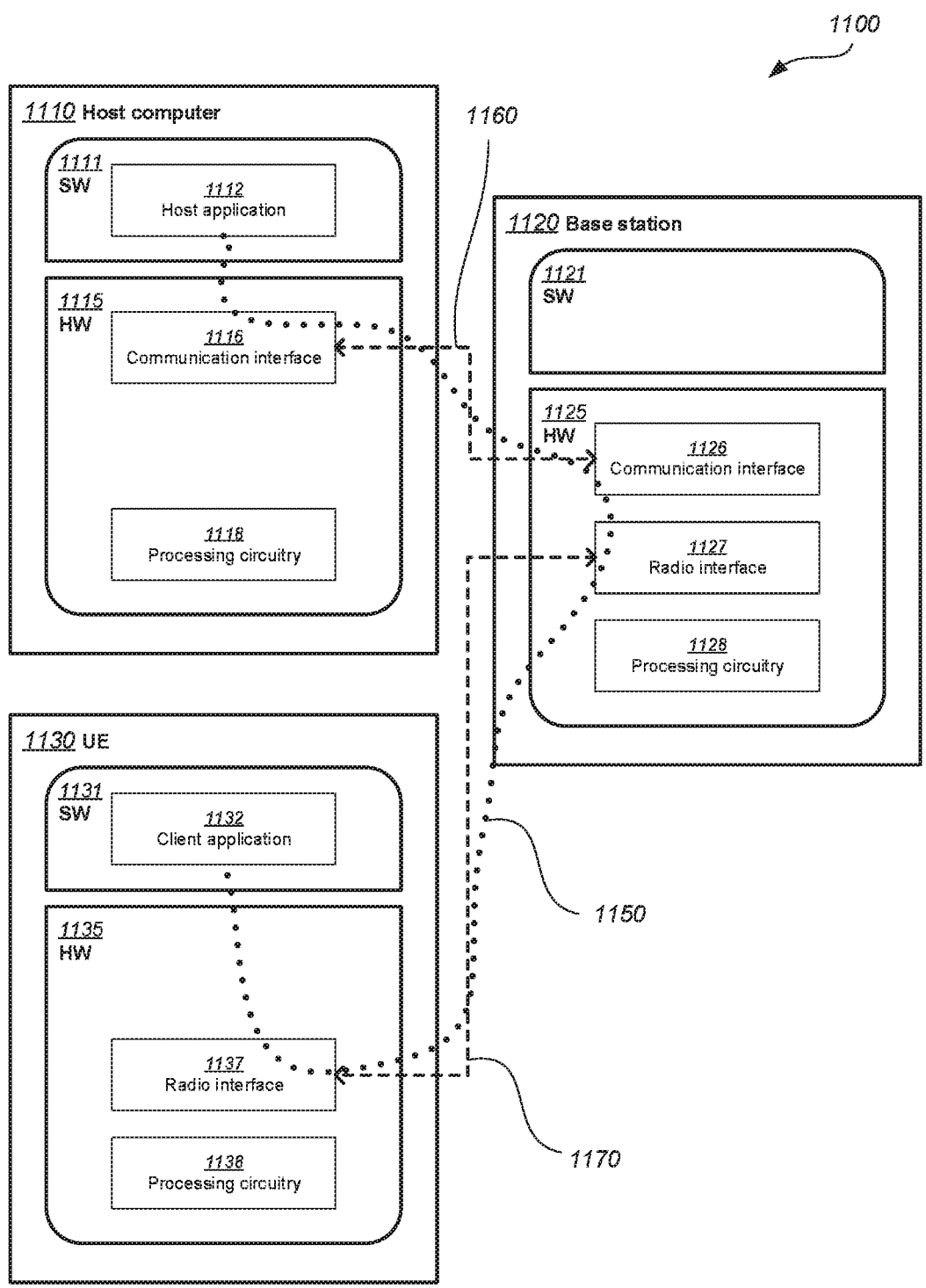
FIG. 11 is a generalized block diagram of a host computer communicating via a base station with a user equipment over a partially wireless connection.

FIG. 11 is a generalized block diagram of a host computer communicating via a base station with a user equipment over a partially wireless connection.

Example implementations, in accordance with an embodiment, of the UE, base station and host computer discussed in the preceding paragraphs will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data which is transmitted using the OTT connection 1150.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station. 1120 further has software 1121 stored internally or accessible via an external connection.

The communication system 1100 further includes the LE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

It is noted that the host computer 1110, base station 1120 and UR 1130 illustrated in FIG. 11 may be identical to the host computer 3230, one of the base stations 3212a, 3212b, 3212c and one of the UEs 3291, 3292 of FIG. 32, respectively. This is to say, the inner workings of these entities may be as shown in FIG. 11 and independently, the surrounding network topology may be that of FIG. 32.

In FIG. 11, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may improve the latency and thereby provide benefits such as reduced user waiting time, better responsiveness, extended battery lifetime.

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or 'dummy' messages, using the OTT connection 1150 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 1310 of the method, the host computer provides user data. In an optional substep (not shown) the host computer provides the user data by executing a host application. In a second step 1320, the host computer initiates a transmission carrying the user data to the UL. The transmission may pass via the base station, in accordance with the teachings of the embodiments described throughout this disclosure. In an optional third step 1330, the UE receives the user data carried in the transmission.

Figures 14, 15:
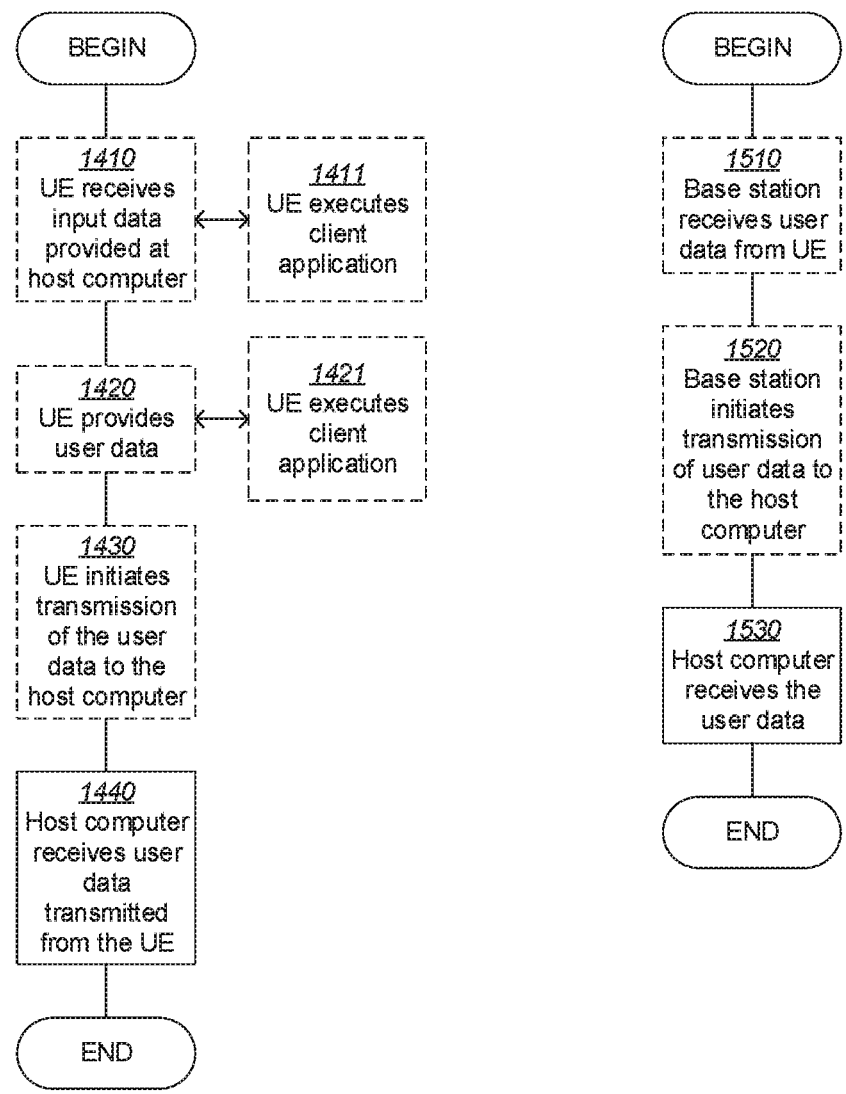

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 1410 of the method, the UE receives input data provided by the host computer. Additionally or alternatively, in an optional second step 1420, the UE provides user data. In an optional substep 1421 of the second step 1420, the IM provides the user data by executing a client application. In a further optional substep 1411 of the first step 1410, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1430, transmission of the user data to the host computer. In a fourth step 1440 of the method, the host computer receives the user data transmitted from the UR, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 1510 of the method, in accordance with the teachings of the embodiments described throughout this disclosure, the base station receives user data from the UE. In an optional second step 1520, the base station initiates transmission of the received user data to the host computer. In a third step 1530, the host computer receives the user data carried in the transmission initiated by the base station.

In an embodiment, the communication system may include a complex of computing devices executing any of the method of the embodiments as described above and data storage devices which could be server parks and data centers.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

LIST OF ACRONYMS

API Application Programming Interface
DDN Digital Data Network
GPRS General Packet Radio Service
IMSI International Mobile Subscriber Identification Number
IMEI International Mobile Equipment Identity
IMEI-SV International Mobile Equipment Identity Software version.
APN Access Point Name
SLA Service Level Agreement
MSISDN Mobile Subscriber International ISDN Number
IP International Protocol
NAT Network Address Translation
DHCP Dynamic Host Configuration Protocol
SCS/AS Service Capability Server/Application Server
SCEF Service Capability Exposure Function
PDN Packet Data Network
HSS Home Subscriber Server HSS
MME Mobility Management Entity
SGSN Serving GPRS Support Node
AF Application Function
NEF Network Exposure Function
UDM Unified Data Management
AMF Access and Mobility Management Function
MTC Machine Type Communication

What is claimed is:

1. A method for supporting event monitoring in a first apparatus, comprising:
    sending to a second apparatus a monitoring request message including a monitoring type parameter indicating a requested monitoring event to be monitored for one or a group of User Equipments (UEs); and
    receiving from the second apparatus a first monitoring response message or a first monitoring indication message including a monitoring event report of the requested monitoring event of the one or group of UEs;

wherein:
  a value of the monitoring type parameter includes a Packet Data Network (PDN) connectivity status of the one or group of UEs; and
  the monitoring event report includes PDN connection information of the one or group of UEs;
wherein:
  the PDN connection information includes a PDN connection status, a PDN type identifying a PDN connection type, and an interface indication identifying an interface between a 3GPP network and either a Service Capability Server (SCS)/Application Server (AS) or an Application Function (AF); and/or
  the PDN connectivity status includes a CREATED status indicating a PDN connection is created or a RELEASED status indicating a PDN connection is released; and
wherein one or more of:
  the PDN connection information further includes an Access Point name, at least one of a UE Internet Protocol (IP) version 4 (Ipv4) address or a UE IP version 6 (Ipv6) address, or both, wherein the UE Ipv6 address is replaced with a UE Ipv6 prefix if a ipv6 full address is unavailable;
  the PDN type includes an IP type indicating a PDN connection of IP type or includes a NON_IP type indicating a PDN connection of non-IP type; or
  the interface indication includes an Exposure function indicating a Service Capability Exposure Function (SCEF) or a Network Exposure Function (NEF) is used for a PDN connection towards an SCS/AS or an AF, or includes a PDN gateway indicating a PDN gateway is used for a PDN connection towards an SCS/AS or AF.

2. The method according to claim 1, wherein the first apparatus is a third party server including a Service Capability Sever (SCS), an Application Server (AS) or an Application Function (AF); and the second apparatus includes a Service Capability Exposure Function (SCEF) or Network Exposure Function (NEF).

3. The method of claim 1, wherein the value of the monitoring type parameter includes a Packet Data Network (PDN) connectivity status of the one or group of UEs, and wherein the PDN connectivity status includes a CREATED status indicating a PDN connection is created or a RELEASED status indicating a PDN connection is released.

4. The method of claim 1, wherein the monitoring event report includes PDN connection information of the one or group of UEs, and wherein the PDN connection information includes a PDN connection status, a PDN type identifying a PDN connection type, and an interface indication identifying an interface between a 3GPP network and either a Service Capability Server (SCS)/Application Server (AS) or an Application Function (AF).

5. The method of claim 1:
  wherein a value of the monitoring type parameter includes a Packet Data Network (PDN) connectivity status of the one or group of UEs, wherein the PDN connectivity status includes a CREATED status indicating a PDN connection is created or a RELEASED status indicating a PDN connection is released; and
  wherein the monitoring event report includes PDN connection information of the one or group of UEs, wherein the PDN connection information includes:
    a PDN connection status;
    a PDN type identifying a PDN connection type, wherein the PDN type includes an IP type indicating a PDN connection of IP type or includes a NON_IP type indicating a PDN connection of non-IP type;
    an interface indication identifying an interface between a 3GPP network and either a Service Capability Server (SCS)/Application Server (AS) or an Application Function (AF), wherein the interface indication includes an Exposure function indicating a Service Capability Exposure Function (SCEF) or a Network Exposure Function (NEF) is used for a PDN connection towards an SCS/AS or an AF, or includes a PDN gateway indicating a PDN gateway is used for a PDN connection towards an SCS/AS or AF; and
    an Access Point name, at least one of a UE Internet Protocol (IP) version 4 (Ipv4) address or a UE IP version 6 (Ipv6) address, or both, wherein the UE Ipv6 address is replaced with a UE Ipv6 prefix if a ipv6 full address is unavailable.

6. A method for supporting event monitoring in a second apparatus, comprising:
  receiving from a first apparatus a first monitoring request message including a monitoring type parameter indicating a requested monitoring event to be monitored for one or a group of User Equipments (UEs); and
  sending to the first apparatus a first monitoring response message or a first monitoring indication message including a monitoring event report of the requested monitoring event of the one or group of UEs;
wherein:
  the monitoring type parameter is a Packet Data Network (PDN) connectivity status parameter indicating a PDN connectivity status of the one or group of UEs; and
  the monitoring event report includes PDN connection information of the one or group of UEs;
wherein:
  the PDN connection information includes a PDN connection status, a PDN type identifying a PDN connection type, and an interface indication identifying an interface between a 3GPP network and either a Service Capability Server (SCS)/Application Server (AS) or an Application Function (AF); and/or
  the PDN connectivity status includes a CREATED status indicating a PDN connection is created or includes a RELEASED status indicating a PDN connection is released;
wherein one or more of:
  the PDN connection information further includes an Access Point name, at least one of a UE Internet Protocol (IP) version 4 (Ipv4) address or a UE IP version 6 (Ipv6) address, or both, wherein the UE Ipv6 address is replaced with a UE Ipv6 prefix if a ipv6 full address is unavailable;
  the PDN type includes an IP type indicating a PDN connection of IP type or includes a NON_IP type indicating a PDN connection of non-IP type; or
  the interface indication includes an Exposure function indicating a Service Capability Exposure Function (SCEF) or a Network Exposure Function (NEF) is used for a PDN connection towards an SCS/AS or an AF, or includes a PDN gateway indicating a PDN gateway is used for a PDN connection towards an SCS/AS or AF.

7. The method according to claim 6, wherein the first apparatus is a third party server including a Service Capability Sever (SCS), an Application Server (AS) or an Application Function (AF); and the second apparatus includes a Service Capability Exposure Function (SCEF) or Network Exposure Function (NEF).

8. The method according to claim 6, further comprising:
sending to a Home Subscriber Server (HSS) or a Unified Data Management (UDM) a second monitoring request message to configure the monitoring event indicated by the monitoring type parameter on the HSS or UDM and on a Mobility Management Entity (MME), a Serving GPRS Support Node (SGSN) or a Access and Mobility Management Function (AMF); and
receiving from the HSS or UDM a third monitoring response message or a third monitoring indication message including the monitoring event report of PDN connection information of the one or group of UEs; or
receiving from the HSS or UDM a fourth monitoring response message or a fourth monitoring indication message indicating acknowledgement of the second monitoring request message or not.

9. The method according to claim 8, further comprising receiving from the MME, SGSN or AMF a fifth monitoring indication message including the monitoring event report of PDN connection information of the one or group of UEs.

10. The method of claim 6, wherein the value of the monitoring type parameter includes a Packet Data Network (PDN) connectivity status of the one or group of UEs, and wherein the PDN connectivity status includes a CREATED status indicating a PDN connection is created or a RELEASED status indicating a PDN connection is released.

11. The method of claim 6, wherein the monitoring event report includes PDN connection information of the one or group of UEs, and wherein the PDN connection information includes a PDN connection status, a PDN type identifying a PDN connection type, and an interface indication identifying an interface between a 3GPP network and either a Service Capability Server (SCS)/Application Server (AS) or an Application Function (AF).

12. The method of claim 6:
wherein the monitoring type parameter is a Packet Data Network (PDN) connectivity status parameter indicating a PDN connectivity status of the one or group of UEs, wherein the PDN connectivity status includes a CREATED status indicating a PDN connection is created or a RELEASED status indicating a PDN connection is released; and
wherein the monitoring event report includes PDN connection information of the one or group of UEs, wherein the PDN connection information includes:
a PDN connection status;
a PDN type identifying a PDN connection type, wherein the PDN type includes an IP type indicating a PDN connection of IP type or includes a NON_IP type indicating a PDN connection of non-IP type;
an interface indication identifying an interface between a 3GPP network and either a Service Capability Server (SCS)/Application Server (AS) or an Application Function (AF), wherein the interface indication includes an Exposure function indicating a Service Capability Exposure Function (SCEF) or a Network Exposure Function (NEF) is used for a PDN connection towards an SCS/AS or an AF, or includes a PDN gateway indicating a PDN gateway is used for a PDN connection towards an SCS/AS or AF; and
an Access Point name, at least one of a UE Internet Protocol (IP) version 4 (Ipv4) address or a UE IP version 6 (Ipv6) address, or both, wherein the UE Ipv6 address is replaced with a UE Ipv6 prefix if a ipv6 full address is unavailable.

13. A first apparatus for supporting event monitoring, comprising:
a transceiver configured to transmit wireless signals to a second apparatus and to receive wireless signals from the second apparatus;
one or more processors; and
one or more memories comprising a computer program configured to, when executed by the one or more processors, cause the first apparatus to:
send to the second apparatus a monitoring request message including a monitoring type parameter indicating a requested monitoring event to be monitored for one or a group of User Equipments (UEs); and
receive from the second apparatus a first monitoring response message or a first monitoring indication message including a monitoring event report of the requested monitoring event of the one or group of UEs;
wherein:
a value of the monitoring type parameter includes a Packet Data Network (PDN) connectivity status of the one or group of UEs; and
the monitoring event report includes PDN connection information of the one or group of UEs;
wherein:
the PDN connection information includes a PDN connection status, a PDN type identifying a PDN connection type, and an interface indication identifying an interface between a 3GPP network and either a Service Capability Server (SCS)/Application Server (AS) or an Application Function (AF); and/or
the PDN connectivity status includes a CREATED status indicating a PDN connection is created or a RELEASED status indicating a PDN connection is released; and
wherein one or more of:
the PDN connection information further includes an Access Point name, at least one of a UE Internet Protocol (IP) version 4 (Ipv4) address or a UE IP version 6 (Ipv6) address, or both, wherein the UE Ipv6 address is replaced with a UE Ipv6 prefix if a ipv6 full address is unavailable;
the PDN type includes an IP type indicating a PDN connection of IP type or includes a NON_IP type indicating a PDN connection of non-IP type; or
the interface indication includes an Exposure function indicating a Service Capability Exposure Function (SCEF) or a Network Exposure Function (NEF) is used for a PDN connection towards an SCS/AS or an AF, or includes a PDN gateway indicating a PDN gateway is used for a PDN connection towards an SCS/AS or AF.

14. The first apparatus according to claim 13, wherein the first apparatus is a third party server including a Service Capability Sever (SCS), an Application Server (AS) or an Application Function (AF); and the second apparatus includes a Service Capability Exposure Function (SCEF) or Network Exposure Function (NEF).

15. The first apparatus according to claim 13, wherein the value of the monitoring type parameter includes a Packet Data Network (PDN) connectivity status of the one or group of UEs, and wherein the PDN connectivity status includes a CREATED status indicating a PDN connection is created or a RELEASED status indicating a PDN connection is released.

16. The first apparatus according to claim 13, wherein the monitoring event report includes PDN connection information of the one or group of UEs, and wherein the PDN connection information includes a PDN connection status, a PDN type identifying a PDN connection type, and an interface indication identifying an interface between a 3GPP network and either a Service Capability Server (SCS)/Application Server (AS) or an Application Function (AF).

17. The first apparatus according to claim 13:
wherein a value of the monitoring type parameter includes a Packet Data Network (PDN) connectivity status of the one or group of UEs, wherein the PDN connectivity status includes a CREATED status indicating a PDN connection is created or a RELEASED status indicating a PDN connection is released; and
wherein the monitoring event report includes PDN connection information of the one or group of UEs, wherein the PDN connection information includes:
a PDN connection status;
a PDN type identifying a PDN connection type, wherein the PDN type includes an IP type indicating a PDN connection of IP type or includes a NON_IP type indicating a PDN connection of non-IP type;
an interface indication identifying an interface between a 3GPP network and either a Service Capability Server (SCS)/Application Server (AS) or an Application Function (AF), wherein the interface indication includes an Exposure function indicating a Service Capability Exposure Function (SCEF) or a Network Exposure Function (NEF) is used for a PDN connection towards an SCS/AS or an AF, or includes a PDN gateway indicating a PDN gateway is used for a PDN connection towards an SCS/AS or AF; and
an Access Point name, at least one of a UE Internet Protocol (IP) version 4 (Ipv4) address or a UE IP version 6 (Ipv6) address, or both, wherein the UE Ipv6 address is replaced with a UE Ipv6 prefix if a ipv6 full address is unavailable.

18. A second apparatus for supporting event monitoring, comprising:
a transceiver configured to transmit wireless signals to a first apparatus and receive wireless signals from the first apparatus;
one or more processors; and
one or more memories comprising computer program configured to, when executed by the one or more processors, cause the first apparatus to:
receive from the first apparatus a first monitoring request message including a monitoring type parameter indicating a requested monitoring event to be monitored for one or a group of User Equipments (UEs); and
send to the first apparatus a first monitoring response message or a first monitoring indication message including a monitoring event report of the requested monitoring event of the one or group of UEs;
wherein:
the monitoring type parameter is a Packet Data Network (PDN) connectivity status parameter indicating a PDN connectivity status of the one or group of UEs; and
the monitoring event report includes PDN connection information of the one or group of UEs;
wherein:
the PDN connection information includes a PDN connection status, a PDN type identifying a PDN connection type, and an interface indication identifying an interface between a 3GPP network and either a Service Capability Server (SCS)/Application Server (AS) or an Application Function (AF); and/or
the PDN connectivity status includes a CREATED status indicating a PDN connection is created or a RELEASED status indicating a PDN connection is released; and
wherein one or more of:
the PDN connection information further includes an Access Point name, at least one of a UE Internet Protocol (IP) version 4 (Ipv4) address or a UE IP version 6 (Ipv6) address, or both, wherein the UE Ipv6 address is replaced with a UE Ipv6 prefix if a ipv6 full address is unavailable;
the PDN type includes an IP type indicating a PDN connection of IP type or includes a NON_IP type indicating a PDN connection of non-IP type; or
the interface indication includes an Exposure function indicating a Service Capability Exposure Function (SCEF) or a Network Exposure Function (NEF) is used for a PDN connection towards an SCS/AS or an AF, or includes a PDN gateway indicating a PDN gateway is used for a PDN connection towards an SCS/AS or AF.

19. The second apparatus according to claim 18, wherein the first apparatus is a third party server including a Service Capability Sever (SCS), an Application Server (AS) or an Application Function (AF); and the second apparatus includes a Service Capability Exposure Function (SCEF) or Network Exposure Function (NEF).

20. The second apparatus according to claim 18, further configured to:
send to a Home Subscriber Server (HSS) or a Unified Data Management (UDM) a second monitoring request message to configure the monitoring event indicated by the monitoring type parameter on the HSS or UDM and on a Mobility Management Entity (MME), a Serving GPRS Support Node (SGSN) or a Access and Mobility Management Function (AMF); and
receive from the HSS or UDM a third monitoring response message or a third monitoring indication message including the monitoring event report of PDN connection information of the one or group of UEs; or
receive from the HSS or UDM a fourth monitoring response message or a fourth monitoring indication message indicating acknowledgement of the second monitoring request message or not.

21. The second apparatus according to claim 20, further configured to receive from the MME, SGSN or AMF a fifth monitoring indication message including the monitoring event report of PDN connection information of the one or group of UEs.

22. The second apparatus according to claim 18, wherein the value of the monitoring type parameter includes a Packet Data Network (PDN) connectivity status of the one or group of UEs, and wherein the PDN connectivity status includes a CREATED status indicating a PDN connection is created or a RELEASED status indicating a PDN connection is released.

23. The second apparatus according to claim 18, wherein the monitoring event report includes PDN connection information of the one or group of UEs, and wherein the PDN connection information includes a PDN connection status, a PDN type identifying a PDN connection type, and an interface indication identifying an interface between a 3GPP network and either a Service Capability Server (SCS)/Application Server (AS) or an Application Function (AF).

24. The second apparatus according to claim 18:
wherein the monitoring type parameter is a Packet Data Network (PDN) connectivity status parameter indicating a PDN connectivity status of the one or group of UEs, wherein the PDN connectivity status includes a CREATED status indicating a PDN connection is created or a RELEASED status indicating a PDN connection is released; and
wherein the monitoring event report includes PDN connection information of the one or group of UEs, wherein the PDN connection information includes:
a PDN connection status;
a PDN type identifying a PDN connection type, wherein the PDN type includes an IP type indicating a PDN connection of IP type or includes a NON_IP type indicating a PDN connection of non-IP type;
an interface indication identifying an interface between a 3GPP network and either a Service Capability Server (SCS)/Application Server (AS) or an Application Function (AF), wherein the interface indication includes an Exposure function indicating a Service Capability Exposure Function (SCEF) or a Network Exposure Function (NEF) is used for a PDN connection towards an SCS/AS or an AF, or includes a PDN gateway indicating a PDN gateway is used for a PDN connection towards an SCS/AS or AF; and
an Access Point name, at least one of a UE Internet Protocol (IP) version 4 (Ipv4) address or a UE IP version 6 (Ipv6) address, or both, wherein the UE Ipv6 address is replaced with a UE Ipv6 prefix if a ipv6 full address is unavailable.

* * * * *

UNITED STATES PATENT AND TRADEMARK OFFICE
CERTIFICATE OF CORRECTION

PATENT NO. : 11,082,867 B2  Page 1 of 8
APPLICATION NO. : 16/343148
DATED : August 3, 2021
INVENTOR(S) : Xu et al.

It is certified that error appears in the above-identified patent and that said Letters Patent is hereby corrected as shown below:

In the Drawings

In Fig. 1, sheet 1 of 10, in Lines 1-15, delete

"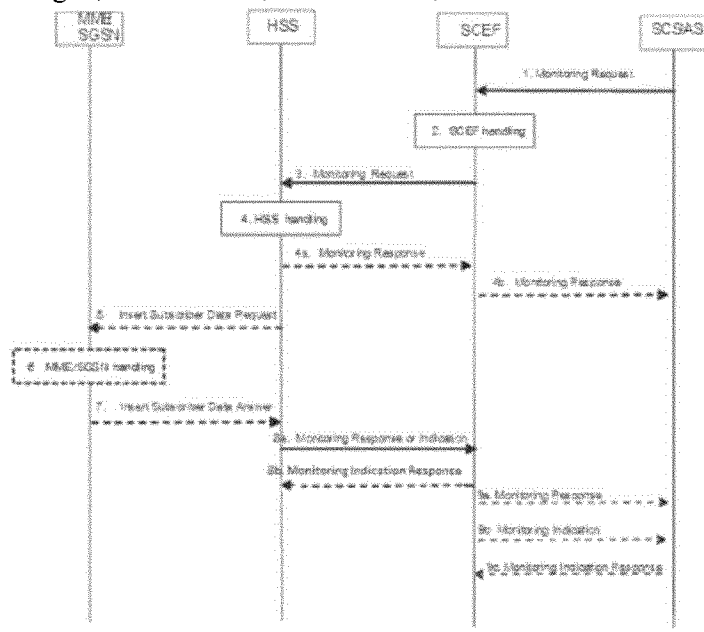" and insert

Signed and Sealed this
Twelfth Day of April, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,082,867 B2

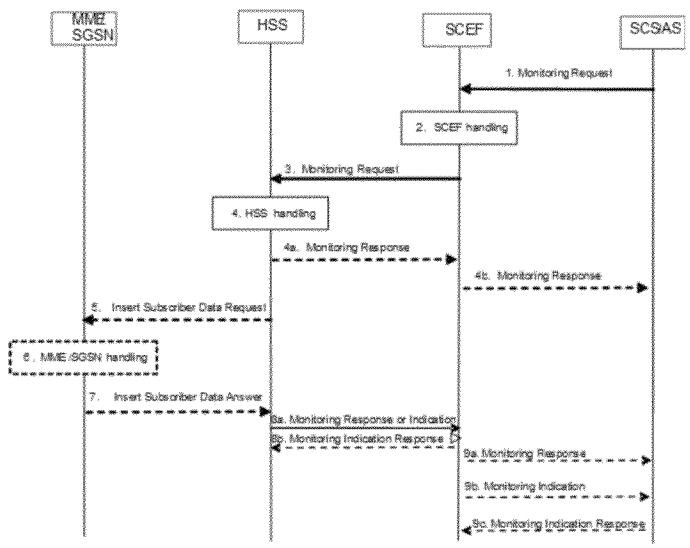

-- Fig. 1 --, therefor.

In Fig. 2, sheet 1 of 10, in Lines 1-8, delete

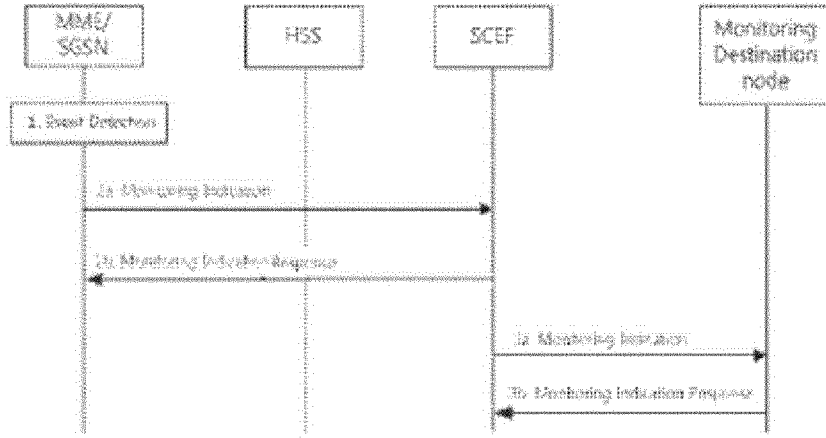

" Fig. 2 " and insert

CERTIFICATE OF CORRECTION (continued)
U.S. Pat. No. 11,082,867 B2

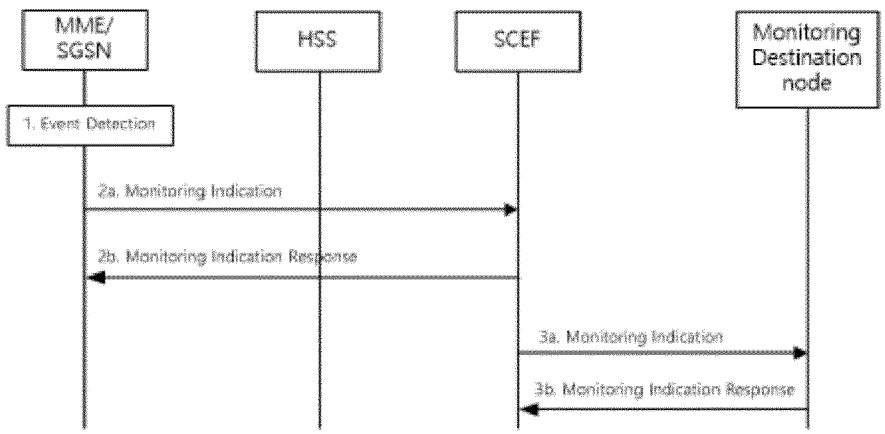

-- Fig. 2                                          --, therefor.

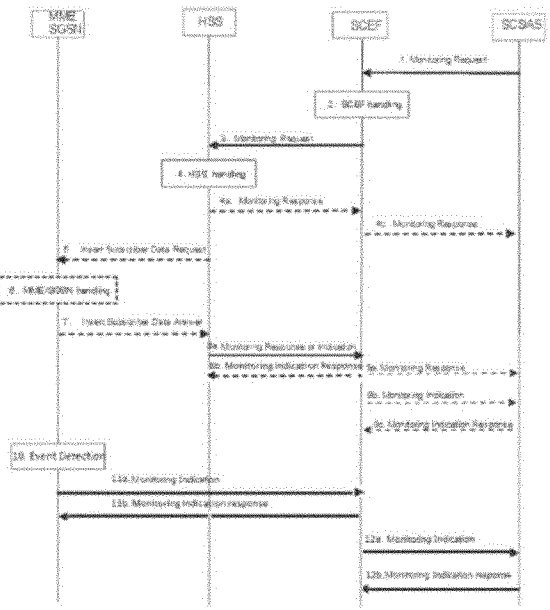

In Fig. 3a, sheet 2 of 10, in Lines 1-19, delete "         Fig. 3a              " and

CERTIFICATE OF CORRECTION (continued)
U.S. Pat. No. 11,082,867 B2

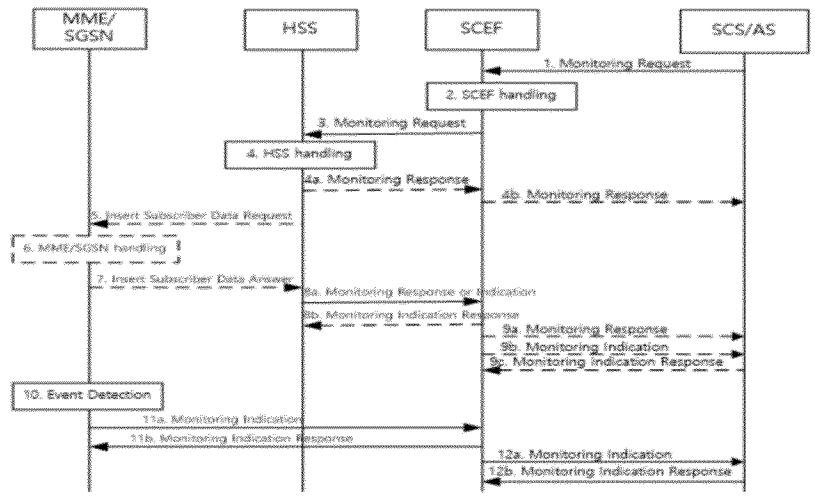

insert -- Fig. 3a --, therefor.

In Fig. 3b, sheet 3 of 10, in Lines 1-21, and on the title page, the print figure, delete

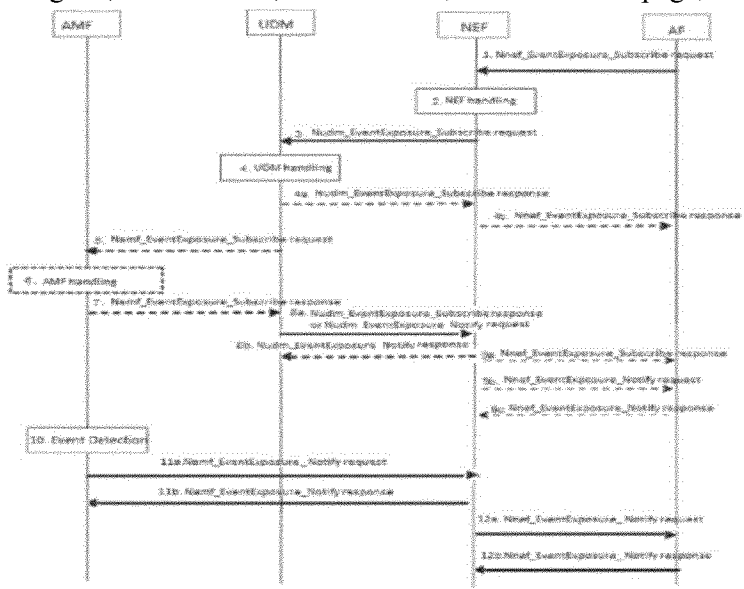

" Fig. 3b " and insert

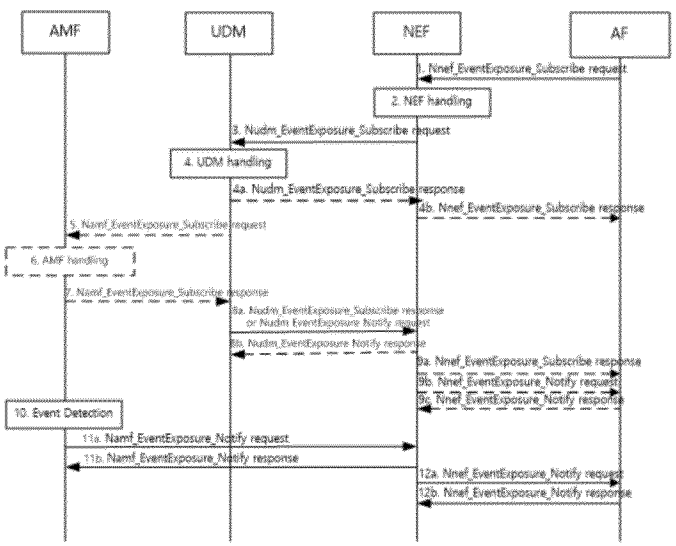

--  Fig. 3b  --, therefor.

In the Specification

In Column 1, Line 31, delete "LE reachability, Location of the LE," and insert -- UE reachability, Location of the UE, --, therefor.

In Column 2, Line 3, delete "optionally" and insert -- optionality --, therefor.

In Column 2, Line 21, delete "Sever" and insert -- Server --, therefor.

In Column 2, Line 34, delete "Ipv4" and insert -- IPv4 --, therefor at each occurrence throughout the Patent.

In Column 2, Line 35, delete "Ipv6" and insert -- IPv6 --, therefor at each occurrence throughout the Patent.

In Column 3, Line 2, delete "Sever" and insert -- Server --, therefor.

In Column 3, Line 66, delete "to: from" and insert -- to/from --, therefor.

In Column 4, Line 57, delete "FIGS. 3*a*-3*b* are a schematic workflow diagram" and insert -- FIGS. 3*a*-3*b* are schematic workflow diagrams --, therefor.

In Column 5, Line 1, delete "FIGS. 6-7 are a schematic block diagram" and insert -- FIGS. 6-7 are schematic block diagrams --, therefor.

CERTIFICATE OF CORRECTION (continued)
U.S. Pat. No. 11,082,867 B2

In Column 5, Line 4, delete "FIGS. 8-9 is a schematic block diagram" and insert -- FIGS. 8-9 are schematic block diagrams --, therefor.

In Column 6, Line 44, delete "Guard. Time" and insert -- Guard Time --, therefor.

In Column 7, Line 39, delete "3GPP IS" and insert -- 3GPP TS --, therefor.

In Column 8, Line 1, delete "AME The" and insert -- AMF. The --, therefor.

In Column 8, Line 3, delete "NEE" and insert -- NEF --, therefor.

In Column 8, Line 7, delete "Which" and insert -- which --, therefor.

In Column 8, Line 44, delete "the Reporting" and insert -- the UE. Reporting --, therefor.

In Column 8, Line 63, delete "UK's" and insert -- UE's --, therefor.

In Column 9, Line 18, delete "Sever" and insert -- Server --, therefor.

In Columns 9 & 10, in Table 1, Under "Description", Line 7, delete "IMSI-IMEISV" and insert -- IMSI-IMEI-SV --, therefor.

In Columns 11 & 12, below Table 1, Line 2, delete "features" and insert -- features. --, therefor.

In Column 13, below Table 2, Line 1, delete "NOTE 1" and insert -- NOTE 1: --, therefor.

In Column 13, Line 42, delete "PdnConnectioninformation." and insert -- PdnConnectionInformation. --, therefor.

In Columns 13-14, in Table 3, Line 18, delete "ipv4" and insert -- IPv4 --, therefor at each occurrence throughout the Patent.

In Columns 13-14, in Table 3, Line 18, delete "ipv6" and insert -- IPv6 --, therefor at each occurrence throughout the Patent.

In Column 14, Line 42, delete "Internet Protocol IF" and insert -- Internet Protocol IP --, therefor.

In Column 15, Line 19, delete "SC S/AS" and insert -- SCS/AS --, therefor.

In Column 16, Line 25, delete "Feature" and insert -- feature --, therefor.

In Columns 15 & 16, in Table 7, under "Description", Line 23, delete "featute" and insert -- feature --, therefor.

In Columns 15 & 16, in Table 7, under "Description", Line 29, delete "uo or" and insert -- up or --, therefor.

In Column 17, Line 1, delete "is schematic" and insert -- is a schematic --, therefor.

In Column 17, Line 16, delete "Sever" and insert -- Server --, therefor.

In Column 18, Line 33, delete "strafing" and insert -- illustrating --, therefor.

In Column 19, Line 22, delete "above" and insert -- above. --, therefor.

In Column 19, Line 48, delete "UR 1092" and insert -- UE 1092 --, therefor.

In Column 21, Line 8, delete "base station. 1120" and insert -- base station 1120 --, therefor.

In Column 21, Line 10, delete "LE" and insert -- UE --, therefor.

In Column 21, Lines 36-42, delete "It is noted that the host computer 1110, base station 1120 and UR 1130 illustrated in FIG. 11 may be identical to the host computer 3230, one of the base stations 3212a, 3212b, 3212c and one of the UEs 3291, 3292 of FIG. 32, respectively. This is to say, the inner workings of these entities may be as shown in FIG. 11 and independently, the surrounding network topology may be that of FIG. 32." and insert -- It is noted that the host computer 1110, base station 1120 and UE 1130 illustrated in FIG. 11 may be identical to the host computer 1030, one of the base stations 1012a, 1012b, 1012c and one of the UEs 1091, 1092 of FIG. 10, respectively. This is to say, the inner workings of these entities may be as shown in FIG. 11 and independently, the surrounding network topology may be that of FIG. 10. --, therefor.

In Column 21, Line 45, delete "use equipment" and insert -- user equipment --, therefor.

In Column 22, Line 57, delete "UL." and insert -- UE. --, therefor.

In Column 23, Line 4, delete "IM provides" and insert -- UE provides --, therefor.

In Column 23, Line 15, delete "UR," and insert -- UE, --, therefor.

In Column 24, Line 36, delete "IMSI International Mobile Subscriber Identification Number" and insert -- IMSI International Mobile Subscriber Identity --, therefor.

In Column 24, Line 39, delete "version." and insert -- Version --, therefor.

In Column 24, Line 42, delete "MSISDN Mobile Subscriber International ISDN Number" and insert -- MSISDN Mobile Station International Subscriber Directory Number --, therefor.

In Column 24, Line 49, delete "Home Subscriber Server HSS" and insert -- Home Subscriber Server --, therefor.

In the Claims

In Column 25, Line 37, in Claim 2, delete "Sever" and insert -- Server --, therefor.

CERTIFICATE OF CORRECTION (continued)
U.S. Pat. No. 11,082,867 B2

In Column 26, Line 67, in Claim 7, delete "Sever" and insert -- Server --, therefor.

In Column 27, Line 10, in Claim 8, delete "a Access" and insert -- an Access --, therefor.

In Column 28, Line 57, in Claim 14, delete "Sever" and insert -- Server --, therefor.

In Column 30, Line 29, in Claim 19, delete "Sever" and insert -- Server --, therefor.

In Column 30, Line 40, in Claim 20, delete "a Access" and insert -- an Access --, therefor.